(12) United States Patent
Fujiwara et al.

(10) Patent No.: US 10,137,660 B2
(45) Date of Patent: Nov. 27, 2018

(54) WATER-REPELLENT, THERMOPLASTIC RESIN SHEET, AND MOLDED ARTICLE

(71) Applicant: Denka Company Limited, Tokyo (JP)

(72) Inventors: Junpei Fujiwara, Isesaki (JP); Tomohiro Osawa, Isesaki (JP); Shogo Hoshino, Isesaki (JP); Toshio Nagano, Chuo-ku (JP); Atsushi Takei, Isesaki (JP)

(73) Assignee: Denka Company Limited, Tokyo (JP)

( * ) Notice: Subject to any disclaimer, the term of this patent is extended or adjusted under 35 U.S.C. 154(b) by 101 days.

(21) Appl. No.: 14/649,783

(22) PCT Filed: Jul. 18, 2013

(86) PCT No.: PCT/JP2013/069549
§ 371 (c)(1),
(2) Date: Jun. 4, 2015

(87) PCT Pub. No.: WO2014/087695
PCT Pub. Date: Jun. 12, 2014

(65) Prior Publication Data
US 2015/0314554 A1    Nov. 5, 2015

(30) Foreign Application Priority Data

Dec. 7, 2012 (JP) ................................ 2012-268286

(51) Int. Cl.
| | |
|---|---|
| *B65D 51/00* | (2006.01) |
| *B32B 1/02* | (2006.01) |
| *B32B 3/30* | (2006.01) |
| *B32B 27/30* | (2006.01) |
| *B32B 27/20* | (2006.01) |
| *B32B 27/32* | (2006.01) |
| *B32B 27/08* | (2006.01) |
| *C09D 5/16* | (2006.01) |

(52) U.S. Cl.
CPC ................ *B32B 3/30* (2013.01); *B32B 1/02* (2013.01); *B32B 27/08* (2013.01); *B32B 27/20* (2013.01); *B32B 27/302* (2013.01); *B32B 27/306* (2013.01); *B32B 27/32* (2013.01); *C09D 5/1681* (2013.01); *C09D 5/1693* (2013.01); *B32B 2255/10* (2013.01); *B32B 2255/26* (2013.01); *B32B 2264/102* (2013.01); *B32B 2270/00* (2013.01); *B32B 2307/31* (2013.01); *B32B 2307/7244* (2013.01); *B32B 2307/73* (2013.01); *B32B 2439/70* (2013.01); *Y10T 428/1352* (2015.01); *Y10T 428/24364* (2015.01)

(58) Field of Classification Search
CPC .............. B32B 7/02; B32B 3/30; B32B 25/08
USPC ................... 428/35.7, 36.7, 141; 264/513
See application file for complete search history.

(56) References Cited

U.S. PATENT DOCUMENTS

| | | | |
|---|---|---|---|
| 6,503,588 B1* | 1/2003 | Hayashi | B32B 27/30 428/215 |
| 2012/0003427 A1* | 1/2012 | Kuroda | B32B 7/02 428/141 |
| 2012/0118886 A1* | 5/2012 | Sekiguchi | B32B 27/06 220/200 |

FOREIGN PATENT DOCUMENTS

| | | |
|---|---|---|
| CN | 102365164 A | 2/2012 |
| JP | 11 58619 | 3/1999 |
| JP | 2003 1736 | 1/2003 |
| JP | 2006 21409 | 1/2006 |
| JP | 2010 184454 | 8/2010 |
| JP | 2010 188584 | 9/2010 |
| JP | 2010 254377 | 11/2010 |
| JP | 2012 17117 | 1/2012 |
| JP | 4878650 B1 | 2/2012 |
| JP | 2012 41049 | 3/2012 |
| JP | 2013 71779 | 4/2013 |

OTHER PUBLICATIONS

International Search Report dated Oct. 22, 2013 in PCT/JP2013/069549 Filed Jul. 18, 2013.
U.S. Appl. No. 14/650,131, filed Jun. 5, 2015, Fujiwara, et al.
Extended European Search Report dated Apr. 25, 2016 in Patent Application No. 13861034.0.
Extended European Search Report dated May 4, 2016 in Patent Application No. 13860589.4.

* cited by examiner

*Primary Examiner* — Ellen S Wood
(74) *Attorney, Agent, or Firm* — Oblon, McClelland, Maier & Neustadt, L.L.P

(57) ABSTRACT

Provided is a water-repellent, thermoplastic resin sheet provided with a textured layer having a microtexture on one surface side, and a water repellent layer formed with an approximately constant thickness on the aforementioned one surface side of the textured layer, wherein at least the surface region on the one surface side of the textured layer is a cross-linked material which maintains the microtexture even after heated drawing, and the water-repellent layer is formed from an olefin copolymer resin containing hydrophobic oxide particles. Also provided is a molded article, such as a molded container, formed by thermoforming the thermoplastic resin sheet.

20 Claims, 4 Drawing Sheets

[FIG. 1]
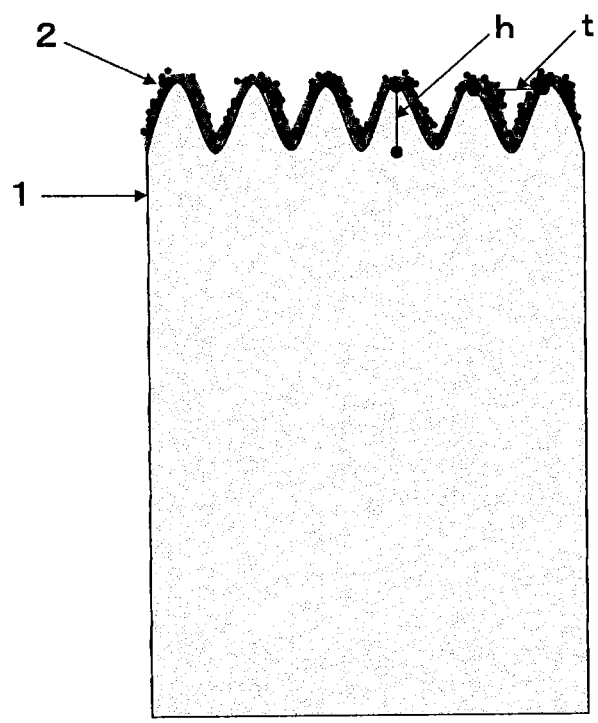
[FIG. 2]
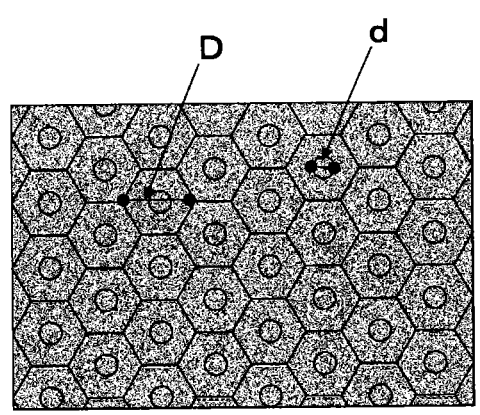

[FIG. 3]
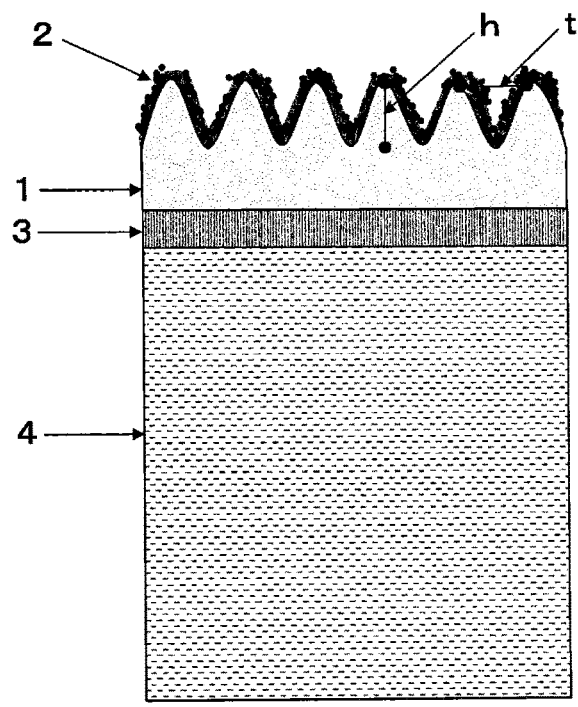
[FIG. 4]
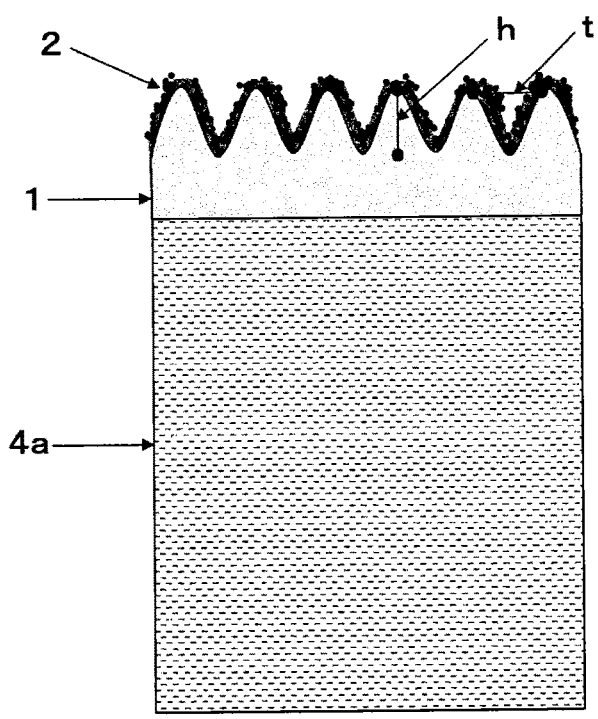

[FIG. 5]
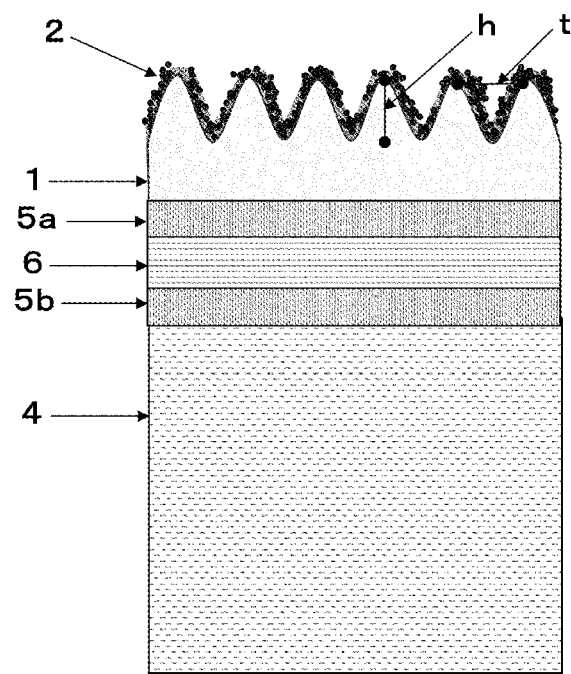
[FIG. 6]
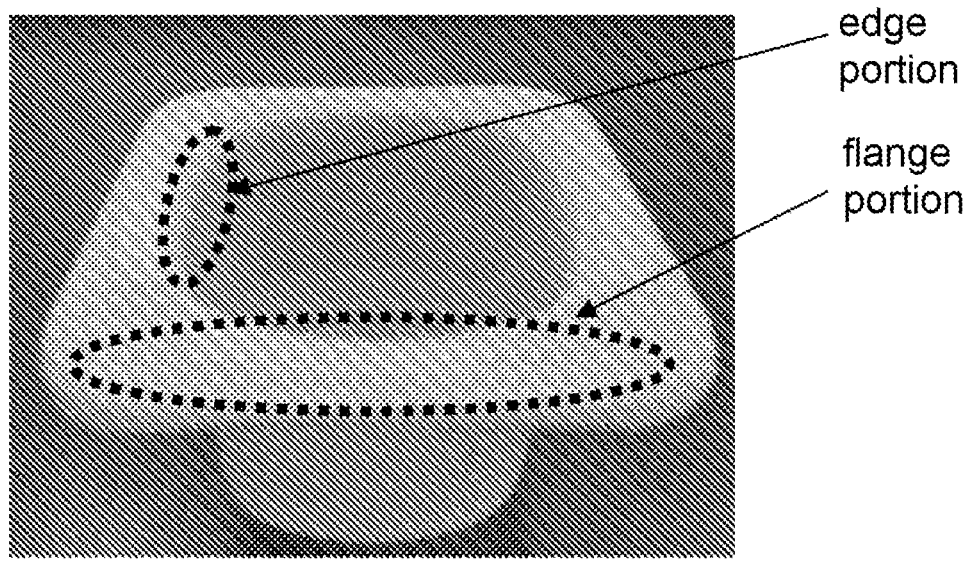

[FIG. 7]
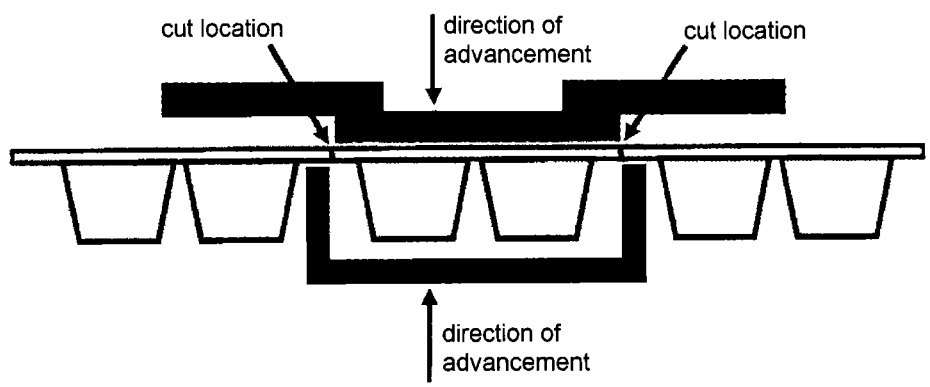

WATER-REPELLENT, THERMOPLASTIC RESIN SHEET, AND MOLDED ARTICLE

TECHNICAL FIELD

The present invention relates to a thermoplastic resin sheet having a water repellent property, and a molded article molded therefrom.

BACKGROUND ART

Conventionally, styrenic resins, which excel in thermoforming capability and rigidity, have been used for containers of soft drinks, juices, specialty beverages/foods and the like. In recent years, such containers have increasingly been produced in a series of steps including molding, filling of content and sealing of the lid. For example, Patent Document 1 proposes a multilayer resin sheet wherein a polystyrene resin layer and a polyolefin resin layer are laminated, preventing the generation of resin whiskers while punching in the process leading to the final product. Additionally, multilayer resin sheets that are endowed with an oxygen barrier property by using a styrenic resin layer as the outermost layer and providing an ethylene-vinyl alcohol copolymer resin layer with an adhesive layer of a modified olefinic resin or the like interposed therebetween, thereby preventing loss of quality due to oxidation of the contents, and multilayer containers consisting thereof, have become common (Patent Document 2).

On the other hand, packaging materials for packaging contents such as food products have had problems in that the contents could adhere to the packaging material. In response, Patent Document 3 proposes a lid member that has long-lasting non-adhesiveness, and Patent Document 4 proposes a similar container.

The multilayer resin sheets formed by laminating a polystyrenic resin layer and a polyolefinic resin layer described above also have the problem of adhesion of food products to packaging materials such as containers using such sheets. Particularly in the case of containers for yogurt, the yogurt can often stick to the top edge portions of the container and splatter when the container is opened. However, the means described in Patent Document 3 were not sufficient to overcome this problem. Additionally, the means described in Patent Document 4 also could not overcome this problem due to non-uniformities in the amount of adhesion of hydrophobic oxide microparticles.

Patent Document 1: JP 2006-21409 A
Patent Document 2: JP H11-58619 A
Patent Document 3: JP 2010-184454 A
Patent Document 4: JP 2010-254377 A

SUMMARY OF THE INVENTION

The present invention was made in view of the above-described circumstances, and in the principal embodiment of the present invention, has the object of offering a resin sheet with little risk of food products adhering when used as a packaging material for food products, and a molded article molded from said resin sheet.

Another embodiment of the present invention has the object of offering a resin sheet that excels in thermoforming capability and rigidity in addition to having excellent food product adhesion resistance, a resin sheet further excelling in an oxygen barrier property, and molded articles molded from said resin sheets.

In other words, the present inventors recognized that adhesion of food products could be prevented by providing water repellence, and upon studying various means for achieving water repellence, discovered that a sheet surface could be provided with high water repellence enabling prevention of food product adhesion by giving the sheet surface a microscopic texture and coating with a water repelling agent, and that the high water repellence could be maintained by crosslinking the resin to preserve the microscopic texture even after heated drawing of the sheet.

Therefore, according to a principal embodiment, the present invention offers a thermoplastic resin sheet having water repellence, comprising a textured layer having a microscopic texture on one surface; and a water repellent layer formed at a roughly constant thickness on the one surface side of the textured layer; wherein at least a surface portion on the one surface side of the textured layer is a crosslinked material that maintains a microscopic texture even after heated drawing, and the water repellent layer consists of an olefinic copolymer resin comprising hydrophobic oxide microparticles. With this thermoplastic resin sheet, the microscopic texture and the water repellence of the water repellent layer together achieve exceptional water repellence, thereby solving the problem of adhesion of food products when used as a material for packaging food products.

Additionally, according to other embodiments, the present invention offers a thermoplastic resin sheet wherein a styrenic resin layer is laminated on the other surface of the textured layer, and a thermoplastic resin sheet wherein a sealant resin layer is formed between the textured layer and the styrenic resin layer. This thermoplastic resin sheet has excellent food product adhesion preventing ability, as well as excelling in thermoforming capability and rigidity.

Furthermore, according to another embodiment, the present invention offers a thermoplastic resin sheet wherein an oxygen barrier resin layer is provided between the textured layer and the styrenic resin layer, and a modified olefinic polymer resin layer is formed both between the oxygen barrier resin layer and the textured layer, and between the oxygen barrier resin layer and the styrenic resin layer. This resin sheet also excels in oxygen barrier properties.

In addition to the above, in a preferable embodiment, the textured layer is formed of a resin composition comprising 20 to 85 mass % of a polyethylene resin and 80 to 15 mass % of a styrene-conjugated diene block copolymer resin, or a resin composition comprising 20 to 85 mass % of a polyethylene resin and 80 to 15 mass % of a polystyrene resin. Additionally, at least a surface portion of the one surface of the textured layer can be an electron-beam-crosslinked material, and by irradiating the one surface of the textured layer with an electron beam, at least a surface portion of the textured layer, preferably the entirety of the textured layer, can be crosslinked to form a crosslinked material. The electron beam irradiation conditions are preferably an acceleration voltage of 110 to 210 kV and a radiation dose of 120 to 400 kGy. The microscopic texture of the textured layer, in one embodiment, has bumps in the form of truncated hexagonal pyramids, with bump heights of 30 to 100 μm, bump bottom diameters of 30 to 150 μm, and an aspect ratio (bump height/bump bottom diameter) of 0.5 to 1.0. Additionally, in a preferred embodiment, the bumps in the texture of the textured layer have a ratio of bump bottom diameter to bump vertex diameter (bump vertex diameter/bump bottom diameter) of 0.05 to 0.4.

Furthermore, in a preferable embodiment, the hydrophobic oxide microparticles are hydrophobic silica comprising trimethylsilyl groups on a surface thereof. In one embodiment, the hydrophobic oxide microparticle content in the water repellent layer is 40 to 80 mass %, and the olefinic copolymer resin content is 60 to 20 mass %. Additionally, in a thermoplastic multilayered resin sheet according to a preferable embodiment, a sliding speed at which liquid slides across the water repellent layer when the sheet is tilted by 70° with the water repellent layer facing upward is 0.01 m/sec to 0.2 m/sec. Additionally, the drawing ratio for heated drawing is preferably 0.05 to 2.5 times, and a rate of decrease of bump height of the textured layer due to heated drawing is 30% or less. More preferably, after heated drawing, a sliding angle between a liquid and a surface of the textured layer on which the water repellent layer is formed is at most 70°.

Furthermore, in one embodiment, the surface of the textured layer on which the water repellent layer is formed is capable of being heat-sealed with a lid member for packaging.

Furthermore, according to one embodiment, the styrenic resin layer is formed of a styrenic resin composition comprising 60 to 15 mass % of polystyrene resin and 40 to 85 mass % of a high-impact polystyrene resin, or an elastomer-containing styrenic resin composition further comprising 5 to 10 parts by mass of a hydrogenated styrenic thermoplastic elastomer with respect to 100 parts by mass of the styrenic resin composition. Additionally, the oxygen barrier resin layer preferably consists of an ethylene-vinyl alcohol copolymer resin.

According to another embodiment, the present invention offers a molded article formed by thermoforming the thermoplastic resin sheet of the present invention. The molded article is preferably a molded container, the molded container is preferably a container for food products, and the container for food products, in one example, is a yogurt container. The molded container according to the present invention particularly excels in water repellence, and is therefore suited for use as a molded container for which adhesion of food products is a problem.

BRIEF DESCRIPTION OF THE DRAWINGS

FIG. 1 A schematic vertical section view of a layer structure of a thermoplastic resin sheet according to a first embodiment of the present invention.

FIG. 2 A schematic plan view of the resin sheet of FIG. 1.

FIG. 3 A schematic vertical section view of a layer structure of a thermoplastic resin sheet according to a second embodiment of the present invention.

FIG. 4 A schematic vertical section view of a layer structure of a thermoplastic resin sheet according to a third embodiment of the present invention.

FIG. 5 A schematic vertical section view of a layer structure of a thermoplastic resin sheet according to a fourth embodiment of the present invention.

FIG. 6 A photograph of an example of a molded container of the present invention.

FIG. 7 A schematic view for explaining a punching process of the container.

MODES FOR CARRYING OUT THE INVENTION

While the thermoplastic resin sheet according to the present invention has a layered arrangement essentially comprising a textured layer and a water repellent layer, various embodiments are possible depending on whether or not there are other layers, and if there are other layers, what kinds of layers they are. Herebelow, various embodiments of the thermoplastic resin sheet will be explained, and the production of thermoplastic resin sheets and molded containers will be explained, but when a specific description of one embodiment applies to another embodiment, then the explanation will be omitted in the other embodiment.

First Embodiment

The thermoplastic resin sheet according to a first embodiment of the present invention, as shown in FIG. 1, is a sheet having water repellence, comprising a textured layer (1) having a microscopic texture on one surface, and a water repellent layer (2) formed at a roughly constant thickness on the one surface side of the textured layer (1), wherein at least a surface portion on one surface side of the textured layer (1) is a crosslinked material maintaining its microscopic texture even after heated drawing, and the water repellent layer (2) consists of an olefinic copolymer resin comprising hydrophobic oxide microparticles. While the thermoplastic resin sheet according to the present embodiment, as explained below, is a structure having a thin water repellent layer formed, usually by coating, on the textured layer, the thickness of the textured layer is adjusted so that the thickness including the texture and the coating thickness (500 nm to 2000 nm) of the water repellent layer is equal to the sheet thickness described below.

While the thermoplastic resin sheet according to the present invention has a textured layer that "maintains the microscopic texture even after heated drawing", this merely indicates that the thermoplastic resin sheet according to the present invention has the property of the sheet being able to maintain a microscopic texture even after heated drawing, and does not mean that the sheet must necessarily undergo heated drawing. Therefore, the thermoplastic resin sheet according to the present invention includes non-drawn sheets in addition to drawn sheets, but is preferably a drawn sheet.

Additionally, the "drawing" mentioned here, in addition to cases in which a sheet is drawn to form a wide sheet, includes cases in which the sheet is drawn when forming a container by molding sheets, especially during molding of corner portions of the container.

Furthermore, in the present invention, the "water repellence" of the resin sheet having water repellence refers to water repellence of a level sufficient to prevent adhesion of food products to the resin sheet, and specifically refers to the case wherein the contact angle of a liquid on the resin sheet is at least 100°. Additionally, in the thermoplastic resin sheet according to the present invention, "water repellence" refers to the case in which the sliding angle of the liquid is at most 70° and/or the sliding speed of a liquid is 0.01 m/sec to 0.2 m/sec in terms of the sliding speed at a tilt angle of 70°.

<Textured Layer (1)>

The textured layer is provided in order to achieve water repellence by means of a microscopic surface texture, and is preferably formed from a resin composition comprising a polyethylene resin and a styrene-conjugated diene block copolymer resin, or a resin composition comprising a polyethylene resin and a polystyrene resin, as resin components.

"Polyethylene resin" refers to polymers of which the main component of the monomers is ethylene, where "main component" means at least 50 mass % of the total amount of monomers, preferably at least 70 mass %, more preferably at least 80 mass %, and even more preferably at least 90 mass %, and of course the entire amount may be ethylene. Therefore, examples of polyethylene resins include high-density polyethylene, low-density polyethylene, linear low-density polyethylene and linear medium-density polyethylene, as well as copolymers, grafts and blends having such structures. The latter resins include, for example, copolymers and blends of resins having polar groups in the polyethylene chain such as ethylene-vinyl acetate copolymers, ethylene-acrylic acid copolymers, ethylene-acrylic acid ester copolymers, ethylene-methacrylic acid ester copolymers, ethylene-vinyl acetate-vinyl chloride copolymers, and further blends with ternary copolymers or the like with acid anhydrides.

Among polyethylene resins, in view of the formability of the texture on the resin layer and crosslinking ability using electron beams, linear low-density polyethylenes and linear medium-density polyethylenes are particularly preferred. While linear low-density polyethylenes and linear medium-density polyethylenes include those polymerized by Ziegler-type catalysts (t-LLDPEs) and those polymerized by metallocene catalysts (m-LLDPEs), the m-LLDPEs are preferably copolymer resins having, as comonomers, ethylenes and olefins with at least three carbon atoms, preferably linear, branched or aromatic nucleus-substituted α-olefins having 3 to 18 carbon atoms. Examples of linear monoolefins include propylene, 1-butene, 1-pentene, 1-hexene, 1-octene, 1-nonene, 1-decene, 1-dodecene, 1-tetradecene, 1-hexadecene and 1-octadecene. Additionally, examples of branched monoolefins include 3-methyl-1-butene, 3-methyl-1-pentene, 4-methyl-1-pentene and 2-ethyl-1-hexene. Additionally, examples of monoolefins substituted with an aromatic nucleus include styrenes and the like. These comonomers can be copolymerized with ethylenes either as a single type or in combinations of two or more types. This copolymerization may involve copolymerization of a polyene such as butadiene, isoprene, 1,4-hexadiene, dicyclopentadiene or 5-ethylidene-2-norbornene. The α-olefin content in this copolymer resin is generally 1 to 20 mol %.

The expression "styrene-conjugated diene block copolymer" refers to polymers comprising, in their structure, polymer blocks mainly composed of styrenic monomers and polymer blocks mainly composed of conjugated diene monomers. Polymer blocks mainly composed of styrenic monomers refer both to polymer blocks consisting only of structures derived from styrenic monomers and polymer blocks comprising structures derived from styrenic monomers by at least 50 mass %. Similarly, polymer blocks mainly composed of conjugated diene monomers refer to both polymer blocks consisting only of structures derived from conjugated diene monomers and polymer blocks comprising structures derived from conjugated diene monomers by at least 50 mass %.

The styrenic monomers that may be used include styrene, o-methylstyrene, p-methylstyrene, p-tert-butylstyrene, 1,3-dimethylstyrene, α-methylstyrene, vinylnaphthalene, vinylanthracene, and 1,1-diphenylethylene. While the present invention mainly uses styrene, one or more of these other components can be included in minute amounts. Additionally, conjugated diene monomers are compounds having conjugated double bonds in their structures, examples of which include 1,3-butadiene (butadiene), 2-methyl-1,3-butadiene (isoprene), 2,3-dimethyl-1,3-butadiene, 1,3-pentadiene, 1,3-hexadiene and 2-methylpentadiene, among which butadiene and isoprene are preferable. The conjugated diene monomers may be used as a single type or as two or more types.

Additionally, the styrene-conjugated diene block copolymers preferably have a conjugate diene content of 12-30 mass % (more preferably 18-27 mass %). In this case, conjugated diene content refers to the proportional mass occupied by structures derived from conjugated diene monomers in the entire copolymer. The styrene-conjugated diene block copolymer can be used as one type or two or more types. In the present invention, the styrene-conjugated diene block copolymer, for example, when the conjugated diene is butadiene, may be a styrene-butadiene (SB) binary copolymer or a styrene-butadiene-styrene (SBS) ternary copolymer, or may be a resin composed of multiple blocks, such as three or more styrene blocks and two or more butadiene blocks. Furthermore, it may have a so-called tapered block structure wherein the component ratio between styrene and butadiene in the blocks continuously changes. Additionally, the styrene-conjugated diene block copolymer may be one that is commercially available, used directly as sold.

The expression "polystyrene resin" refers to a resin mainly composed of styrene monomers, possibly including minute amounts of one or more aromatic vinyl compounds such as o-methylstyrene, p-methylstyrene, p-tert-butylstyrene, 1,3-dimethylstyrene, α-methylstyrene, vinylnaphthalene, vinylanthracene, and 1,1-diphenylethylene, such resins generally being known as GPPS, of which a commercially available resin can be used.

The textured layer is preferably formed from a resin composition comprising 20 to 85 mass % (more preferably 20 to 80 mass %) of a polyethylene resin and 80 to 15 mass % (more preferably 80 to 20 mass %) of a styrene-conjugated diene block copolymer resin, or a resin composition comprising 20 to 85 mass % (more preferably 20 to 80 mass %) of a polyethylene resin and 80 to 15 mass % (more preferably 80 to 20 mass %) of a polystyrene resin. Setting the composition in this range results in a textured layer capable of satisfying texture forming ability (transferability) in a thermal transfer method or the like for providing a texture on the sheet surface, crosslinking ability, and sealability (achieving peel strength). In contrast, if the amount of the polyethylene resin exceeds 85 mass %, sufficient peel strength may not be achieved, or resin whiskers may be formed when punching out thermoformed containers, whereas if the amount of the polyethylene resin is less than 20 mass %, the texture may not be able to be maintained after thermoforming.

Additionally, while this layer consisting of a resin composition, when the thermoplastic resin sheet is molded into a molded container, will be a layer constituting the upper surface of a top edge portion of the mouth of the molded container, when formed from a resin composition comprising 20 to 85 mass % of a polyethylene resin and 80 to 15 mass % of a styrene-conjugated diene block copolymer resin, or a resin composition comprising 20 to 85 mass % of a polyethylene resin and 80 to 15 mass % of a polystyrene resin, it can be heat-sealed to a lid member for packaging, for example, a lid member of a yogurt container or the like, by a hot-melt adhesive (a composition consisting of a wax, rosin, ethylene-vinyl acetate copolymer or the like) or a lacquer coating (a composition consisting of an acrylic resin, polyester resin or the like). For heat-sealing, the lid member is pressed against the top surface of the textured layer with a hot iron, upon which the raised portions of the textured layer are flattened to provide a peelable seal with an appropriate level of adhesiveness.

While the texture is provided to confer water repellence to the sheet and refers to a microscopic texture that is contoured to confer water repellence to the sheet, it may be in any form. For example, the raised portions of the texture may consist of pyramidal shapes such as triangular pyramids, square pyramids, hexagonal pyramids, octagonal pyramids or cones, or truncated pyramids or truncated cones, but upon studying various sheet arrangements according to the present embodiment, the present inventors discovered that bumps in the form of truncated hexagonal pyramids are particularly preferable (see FIG. 2). Additionally, they found that bumps with heights of 30 to 100 µm, diameters D (bottom diameter, measured as the length of a diagonal of the hexagon) of 30 to 150 µm, and an aspect ratio (bump height/bump bottom diameter) of 0.5 to 1.0 are even more preferable. Even outside these ranges, excellent water repellence can be obtained compared to the case in which a texture is absent, but setting the texture to be within this range enables the texture to be adequately maintained even after thermoforming, so that the water repellence can be kept high. In contrast, if the bump height is less than 30 µm, sufficient water repellence may not be able to be retained after thermoforming, whereas if the bump height exceeds 100 µm, the dimensions of the texture formed by a mold for providing the texture can be unstable. If the bump bottom diameter is less than 30 µm, the dimensions of the texture formed by a mold for providing the texture can be unstable, and if the bump bottom diameter exceeds 150 µm, the appearance of the textured surface after thermoforming may be unattractive.

Furthermore, the bumps in the texture should preferably be such that a ratio of bump bottom diameter D to bump vertex diameter d (bump vertex diameter/bump bottom diameter) is 0.05 to 0.40. By setting the texture within this range, the texture can be adequately maintained even after thermoforming, enabling the water repellence to be kept high. In contrast, if the ratio is less than 0.05, texture molds with a ratio of less than 0.05 can be difficult to produce, and if the ratio is 0.40 or more, the water repellence may not be able to be maintained after thermoforming.

The arrangement of bumps is not particularly limited, and they may be in a grid arrangement positioned in columns and rows, or in a staggered arrangement. A staggered arrangement is preferred in order to maintain better water repellence after thermoforming.

<Water Repellent Layer (2)>

The water repellent layer is formed at a roughly constant thickness above the textured layer so that the texture of the textured layer is mostly preserved on the sheet surface, and is provided so as to further enhance the water repellence due to the texture of the textured layer with the water repellence of the water repellent layer itself and to maintain the water repellence even after thermoforming to a container or the like, and consists of an olefinic copolymer resin comprising hydrophobic oxide microparticles.

The hydrophobic oxide microparticles are not particularly limited as long as they have hydrophobicity, and may be hydrophobized by means of a surface treatment. For example, microparticles whose surface condition is made hydrophobic by subjecting hydrophobic oxide microparticles to a surface treatment with a silane coupling agent or the like may be used. The type of oxide is also not restricted as long as it has hydrophobicity. For example, one or more of silica (silicon dioxide), alumina or titania can be used. These may be employed in publicly known or commercially available forms. For example, examples of silicas include those of the product names "Aerosil R972", "Aerosil R972V", "Aerosil R972CF", "Aerosil R974", "Aerosil RX200", "Aerosil RY200" (the above being products of Nippon Aerosil), "Aerosil R202", "Aerosil R805", "Aerosil R812" and "Aerosil R812S" (the above being products of Evonik Degussa). Examples of titania include "Aeroxide TiO2 T805" (Evonik Degussa). Examples of alumina include microparticles obtained by treating the product "Aeroxide Alu C" (Evonik Degussa) with a silane coupling agent to make the particle surface hydrophobic.

Among these, hydrophobic silica microparticles are preferably used. In particular, hydrophobic silica microparticles having trimethylsilyl groups on the surface are preferred for being capable of achieving superior water repellence. Examples of commercially available products corresponding thereto are, for example, "Aerosil R812" and "Aerosil R812S" (both available from Evonik Degussa).

The olefinic copolymer to form the substrate for the water repellent layer may be a low-density polyethylene, an ultralow-density polyethylene (copolymer of ethylene and α-olefin), an ethylene-vinyl acetate copolymer (EVA), an ethylene-alkyl acrylate copolymer, an ethylene-alkyl methacrylate copolymer, an ethylene-acrylic acid copolymer, an ethylene-methacrylic acid copolymer, a low-density polyethylene, an ionomer of low-density polyethylene or the like, or a propylene-based elastomer material, of which ethylene-vinyl acetate copolymers are preferably used.

The water repellent layer preferably has a hydrophobic oxide microparticle content of 40 to 80 mass % (more preferably 40 to 70 mass %), and an olefinic copolymer resin content of 60 to 20 mass % (more preferably 60 to 30 mass %). By setting the composition within this range, it is possible to achieve water repellence and liquid slidability even after forming a multilayer resin sheet and thermoforming. On the other hand, if the hydrophobic oxide microparticle content is less than 40 mass %, it may not be possible to obtain satisfactory water repellence and liquid slidability, and if the hydrophobic oxide microparticle content exceeds 80 mass %, the hydrophobic oxide microparticles may come free.

Second Embodiment

The thermoplastic resin sheet according to a second embodiment of the present invention, as shown in FIG. 3, is a sheet having water repellence, comprising a textured layer (1) having a microscopic texture on one surface, a water repellent layer (2) formed at a roughly constant thickness on the one surface side of the textured layer (1), and a styrenic resin layer (4) (substrate layer) laminated on the other surface side of the textured layer (1) with a sealant resin layer (3) interposed therebetween, wherein at least a surface portion on the one surface side of the textured layer (1) is a crosslinked material maintaining its microscopic texture even after heated drawing, and the water repellent layer (2) consists of an olefinic copolymer resin comprising hydrophobic oxide microparticles. In other words, the layer structure of the thermoplastic resin sheet according to the second embodiment, from top to bottom, consists of water repellent layer (2)/textured layer (1)/sealant resin layer (3)/styrenic resin layer (4). Since the water repellent layer and textured layer are the same as those in the first embodiment, their explanations will be omitted. However, the thickness of the textured layer is preferably 50 to 250 µm (more preferably 50 to 200 µm). If less than 50 µm, the textured layer can be cut off when stretched after thermoforming, which may expose the sealant resin layer (3). Additionally, if 250 µm is exceeded, then resin whiskers may be generated when punching out the thermoformed container.

<Styrenic Resin Layer (4): Substrate Layer>

Examples of the styrenic resin used for the styrenic resin layer to form the substrate layer include homo- or copolymers of styrenic monomers such as styrene, α-methylstyrene, p-methylstyrene, dimethylstyrene, p-t-butylstyrene and chlorostyrene, copolymers of said styrenic monomers with other monomers, such as styrene-acrylonitrile copolymers (AS resins), or graft polymers obtained by graft polymerization of said styrenic monomers with other polymers in the presence of dienic rubber polymers such as polybutadiene, styrene-butadiene copolymers, polyisoprene and polychloroprene, such as high-impact polystyrene (HIPS resins) and styrene-acrylonitride graft polymers (ABS resins).

Of these, polystyrene (GPPS resins) and high-impact polystyrene (HIPS resins) are preferable in view of rigidity and moldability of the molded container.

The styrenic resin layer is preferably formed from a resin composition comprising 60 to 15 mass % (more preferably 55 to 15 mass %) of a polystyrene resin and 40 to 85 mass % (more preferably 45 to 85 mass %) of a high-impact polystyrene resin. If the high-impact polystyrene resin is less than 40%, then the container strength may not be sufficient for practical use, and if more than 85 mass %, this may cause problems such as adhesion of the heating platen during thermoforming.

Additives may be added to the styrenic resin layer as needed within a range not interfering with the effects of the present invention, including colorants such as pigments and dyes, mold release agents such as silicone oils and alkyl esters, fiber reinforcing agents such as glass fibers, particulate lubricants such as talc, clay and silica, antistatic agents such as salt compounds of sulfonic acid and alkali metals and polyalkylene glycol, UV absorbing agents, and antimicrobial agents. Additionally, scrap resins generated during the production process of the multilayered resin sheet of molded article of the present invention may be mixed and used.

<Sealant Resin Layer (3)>

The sealant resin layer achieves adhesion between the textured layer and the styrenic resin layer (substrate layer). The resin component may be a resin comprising 90 to 95 mass % of a high-impact polystyrene resin and 5 to 10 mass % of a hydrogenated styrenic thermoplastic elastomer, 100 mass % of a styrene-conjugated diene block copolymer resin, 100 mass % of a hydrogenated styrenic thermoplastic elastomer, or 100 mass % of a modified olefinic polymer resin.

Examples of the "styrenic resin" include homo- or copolymers of styrenic monomers such as styrene, α-methylstyrene, p-methylstyrene, dimethylstyrene, p-t-butylstyrene and chlorostyrene, copolymers of said styrenic monomers with other monomers, such as styrene-acrylonitrile copolymers (AS resins), or graft polymers obtained by graft polymerization of said styrenic monomers with other polymers in the presence of dienic rubber polymers such as polybutadiene, styrene-butadiene copolymers, polyisoprene and polychloroprene, such as high-impact polystyrene (HIPS resins) and styrene-acrylonitrile graft polymers (ABS resins).

Of these, high-impact polystyrene (HIPS resins) are preferable in view of the rigidity and moldability of the molded container.

Examples of the "hydrogenated styrenic thermoplastic elastomer" include hydrogenated copolymers of styrenic monomers and butadiene or isoprene, hydrogenated styrene-butadiene-styrene block copolymers (styrene-ethylene butylene-styrene block copolymers) and hydrogenated styrene-isoprene-styrene block copolymers (styrene-ethylene propylene-styrene block copolymers), of which styrene-ethylene butylene-styrene block copolymers are particularly preferred. Specifically, Dynaron 8601P of JSR and Tuftec P2000 and H1041 of Asahi Kasei are preferably used, and the component ratio of styrene to ethylene/butylene is preferably in the range of 12/88 to 67/33.

The expression "styrene-conjugated diene block copolymer" refers to polymers comprising, in their structure, polymer blocks mainly composed of styrenic monomers and polymer blocks mainly composed of conjugated diene monomers. Polymer blocks mainly composed of styrenic monomers refer both to polymer blocks consisting only of structures derived from styrenic monomers and polymer blocks comprising structures derived from styrenic monomers by at least 50 mass %. Similarly, polymer blocks mainly composed of conjugated diene monomers refer to both polymer blocks consisting only of structures derived from conjugated diene monomers and polymer blocks comprising structures derived from conjugated diene monomers by at least 50 mass %.

The styrenic monomers that may be used include styrene, o-methylstyrene, p-methylstyrene, p-tert-butylstyrene, 1,3-dimethylstyrene, α-methylstyrene, vinylnaphthalene, vinylanthracene, and 1,1-diphenylethylene. While the present invention mainly uses styrene, one or more of these other components can be included in minute amounts. Additionally, conjugated diene monomers are compounds having conjugated double bonds in their structures, examples of which include 1,3-butadiene (butadiene), 2-methyl-1,3-butadiene (isoprene), 2,3-dimethyl-1,3-butadiene, 1,3-pentadiene, 1,3-hexadiene and 2-methylpentadiene, among which butadiene and isoprene are preferable. The conjugated diene monomers may be used as a single type or as two or more types.

Additionally, the styrene-conjugated diene block copolymers preferably have a conjugated diene content of 12-30 mass % (more preferably 18-27 mass %). In this case, conjugated diene content refers to the proportional mass occupied by structures derived from conjugated diene monomers in the entire copolymer. The styrene-conjugated diene block copolymer can be used as one type or two or more types. In the present invention, the styrene-conjugated diene block copolymer, for example, when the conjugated diene is butadiene, may be a styrene-butadiene (SB) binary copolymer or a styrene-butadiene-styrene (SBS) ternary copolymer, or may be a resin composed of multiple blocks, such as three or more styrene blocks and two or more butadiene blocks. Furthermore, it may have a so-called tapered block structure wherein the component ratio between styrene and butadiene in the blocks continuously changes. Additionally, the styrene-conjugated diene block copolymer may be one that is commercially available used directly as sold.

Representative examples of the "modified olefinic polymer resin" include olefinic resins such as polymers of a single olefin having 2 to 8 carbon atoms, such as ethylene, propylene and butene-1, and copolymers of said olefins with other olefins having 2 to 20 carbon atoms such as ethylene, propylene, butene-1,3-methylbutene-1, pentene-1,4-methylpentene-1, hexene-1, octene-1 and decene-1, or with vinyl compounds such as vinyl acetate, vinyl chloride, acrylic acid, methacrylic acid, acrylic acid esters, methacrylic acid esters and styrenes, or olefinic rubbers such as ethylene-propylene copolymers, ethylene-propylene-diene copolymers, ethylene-butene-1 copolymers and propylene-butene-1 copolymers, modified under graft reaction conditions with unsaturated carboxylic acids such as acrylic acid, methacrylic acid, crotonic acid, isocrotonic acid, maleic acid, fumaric acid, ithaconic acid, citraconic acid and tetrahydrophthalic acid, or derivatives such as acid halides, amides, imides, anhydrides and esters thereof, specifically malenyl chloride, maleimide, maleic acid anhydride, citroconic acid anhydride, monomethyl maleate, dimethyl maleate and glycidyl maleate.

Of these, ethylenic resins, propylenic resins, or ethylene-propylene or butene-1 copolymer rubbers modified with unsaturated dicarboxylic acids or anhydrides thereof, particularly maleic acid or anhydrides thereof, are preferred.

The thickness of the sealant resin layer (3) should preferably be 20 to 90 μm, more preferably 40 to 80 μm. If less than 20 μm, interlayer separation may occur between the textured layer and the substrate layer when molding the container, and if more than 90 μm, resin whiskers may be generated when punching out the thermoformed container.

Third Embodiment

The thermoplastic resin sheet according to a third embodiment of the present invention, as shown in FIG. 4, is a sheet having water repellence, comprising a textured layer (1) having a microscopic texture on one surface, a water repellent layer (2) formed at a roughly constant thickness on the one surface side of the textured layer (1), and a styrenic resin layer (4a) (substrate layer) laminated directly onto the other surface side of the textured layer (1), wherein at least a surface portion on the one surface side of the textured layer (1) is a crosslinked material maintaining its microscopic texture even after heated drawing, and the water repellent layer (2) consists of an olefinic copolymer resin comprising hydrophobic oxide microparticles. In other words, the layer structure of the thermoplastic resin sheet according to the third embodiment, from top to bottom, consists of water repellent layer (2)/textured layer (1)/styrenic resin layer (4), which is the layer structure of the thermoplastic resin sheet according to the third embodiment, with the sealant resin layer removed. Since the water repellent layer and textured layer are the same as those in the first embodiment and the second embodiment, their explanations will be omitted. On the other hand, the styrenic resin layer (4a) in the present embodiment should preferably have sufficient adhesiveness with respect to the textured layer, and therefore should preferably be formed using a resin composition obtained by adding a hydrogenated styrenic thermoplastic elastomer to the styrenic resin (4) explained in the second embodiment. This hydrogenated styrenic thermoplastic elastomer is the same as that used in the sealant resin layer (3) in the second embodiment.

Therefore, in the thermoplastic resin sheet according to the third embodiment, the styrenic resin layer used as the substrate layer should preferably be an elastomer-containing styrenic resin composition comprising 5 to 10 parts by mass of a hydrogenated styrenic thermoplastic elastomer with respect to 100 parts by mass of a styrenic resin layer (the styrenic resin layer preferably used in the resin sheet according to the second embodiment) comprising 60 to 15 mass % (more preferably 55 to 15 mass %) of polystyrene resin and 40 to 85 mass % (more preferably 45 to 85 mass %) of high-impact polystyrene resin. If the amount of hydrogenated styrenic thermoplastic elastomer added is less than 5 parts by mass, then the interlayer adhesion may be insufficient and lead to interlayer separation, and if it is more than 10 parts by mass, resin whiskers may be generated when punching out the thermoformed container.

Instead of the hydrogenated styrenic thermoplastic elastomer, it is possible to add other resins used in the sealant resin layer (3) of the second embodiment, for example, a styrene-conjugated diene block copolymer resin, or a modified olefinic polymer resin.

Fourth Embodiment

The thermoplastic multilayered resin sheet according to a fourth embodiment of the present invention, as shown in FIG. 5, is a sheet having water repellence, comprising a textured layer (1) having a microscopic texture on one surface, a water repellent layer (2) formed at a roughly constant thickness on the one surface side of the textured layer (1), an oxygen barrier resin layer (6) laminated onto the other surface side of the textured layer (1) with a modified olefinic polymer resin layer (5a) interposed therebetween, and a styrenic resin layer (4) (substrate layer) laminated on the other face of the oxygen barrier resin layer (6) with a modified olefinic polymer resin layer (5b) interposed therebetween, wherein at least a surface portion on the one surface side of the textured layer (1) is a crosslinked material maintaining its microscopic texture even after heated drawing, and the water repellent layer (2) consists of an olefinic copolymer resin comprising hydrophobic oxide microparticles. In other words, the layer structure of the thermoplastic resin sheet according to the fourth embodiment, from top to bottom, consists of water repellent layer (2)/textured layer (1)/modified olefinic resin layer (5a)/oxygen barrier resin layer (6)/modified olefinic polymer resin layer (5b)/styrenic resin layer (4). Since the water repellent layer and textured layer are the same as those explained for the first embodiment and the styrenic resin layer (substrate layer) is the same as that explained for the second embodiment, their explanations will be omitted. However, the thickness of the textured layer is preferably 50 to 250 μm (more preferably 50 to 200 μm). If less than 50 μm, the textured layer can be cut when stretched after thermoforming, which may expose the sealant resin layer. Additionally, if 250 μm is exceeded, then resin whiskers may be generated when punching out the thermoformed container.

<Oxygen Barrier Resin Layer (6)>

Representative examples of oxygen barrier resins that may be used to form the oxygen barrier resin layer include ethylene-vinyl alcohol copolymer resins and polyamide resins. Of these, ethylene-vinyl alcohol copolymer resins are preferable in terms of processability and moldability.

Ethylene-vinyl alcohol copolymer resins are usually obtained by saponification of ethylene-vinyl acetate copolymers, and in order to achieve an oxygen barrier capability, processability and moldability, those with an ethylene content of 10 to 65 mol %, preferably 20 to 50 mole %, and a degree of saponification of at least 90%, and preferably at least 95% are preferred.

Additionally, examples of polyamide resins include lactam polymers such as caprolactam and laurolactam, polymers of aminocarboxylic acids such as 6-aminocapronic acid, 11-aminoundecanoic acid and 12-aminododecanoic acid, and polycondensates of diamine units including aliphatic diamines such as hexamethylene diamine, decamethylene diamine, dodecamethylene diamine and 2,2,4- or 2,4,4-trimethylhexamethylene diamine, alicyclic diamines such as 1,3- or 1,4-bis(aminomethyl)cyclohexane and bis(p-aminocyclohexylmethane), and aromatic diamines such as m- or p-xylylene diamine with dicarboxylic acid units such as aliphatic dicarboxylic acids such as adipic acid, suberic acid and sebacic acid, acyclic dicarboxylic acids such as cyclohexane dicarboxylic acid, and aromatic dicarboxylic acids such as terephthalic acid and isophthalic acid.

Specific polyamide resins include nylon-6, nylon-9, nylon-11, nylon-12, nylon-66, nylon-610, nylon-611, nylon-612, nylon-6T, nylon-6I, nylon-MXD6, nylon-6/66, nylon-6/610, nylon-6/6T and nylon 6I/6T, of which nylon-6 and nylon-MXD6 are preferred.

The thickness of the oxygen barrier resin layer is preferably 10 to 50 μm, more preferably 20 to 40 μm. If less than 10 μm, the oxygen barrier capability may not be sufficient to prevent loss of quality due to oxidation of the content of the molded container, and if more than 50 μm, resin whiskers may be generated when punching out the thermoformed container.

<Modified Olefinic Polymer Resin Layer (5a, 5b)>

Examples of the modified olefinic polymer resin used to form the modified olefinic polymer resin layers (5a, 5b) include olefinic resins such as polymers of a single olefin with 2 to 8 carbon atoms, such as ethylene, propylene and butene-1, and copolymers of said olefins with other olefins with 2 to 20 carbon atoms such as ethylene, propylene, butene-1,3-methylbutene-1, pentene-1,4-methylpentene-1, hexene-1, octene-1 and decene-1, or with vinyl compounds such as vinyl acetate, vinyl chloride, acrylic acid, methacrylic acid, acrylic acid esters, methacrylic acid esters and styrenes, or olefinic rubbers such as ethylene-propylene copolymers, ethylene-propylene-diene copolymers, ethylene-butene-1 copolymers and propylene-butene-1 copolymers, modified under graft reaction conditions with unsaturated carboxylic acids such as acrylic acid, methacrylic acid, crotonic acid, isocrotonic acid, maleic acid, fumaric acid, ithaconic acid, citraconic acid and tetrahydrophthalic acid, or derivatives such as acid halides, amides, imides, anhydrides and esters thereof, specifically malenyl chloride, maleimide, maleic acid anhydride, citraconic acid anhydride, monomethyl maleate, dimethyl maleate and glycidyl maleate.

Of these, ethylenic resins, propylenic resins, or ethylene-propylene or butene-1 copolymer rubbers modified with unsaturated dicarboxylic acids or anhydrides thereof, particularly maleic acid or anhydrides thereof, are preferred.

The thickness of the modified olefinic polymer resin layer, on both sides, should preferably be 10 to 50 μm, more preferably 20 to 40 μm. If less than 10 μm, sufficient interlayer adhesive strength may not be obtained, and if more than 50 μm, resin whiskers may be generated when punching out the thermoformed container.

<Production of Thermoplastic Resin Sheet>

The method for producing a thermoplastic resin sheet according to the present invention is not limited, and may be any method, but it will typically involve steps of producing a single layer sheet consisting of a textured layer having texture on one surface side or a multilayered laminated resin sheet having said textured layer, then performing a crosslinking treatment by irradiating the surface of the texture on the textured layer with electron beams, and finally forming a water repellent layer on the surface of the texture of the textured layer.

First, when producing the single layer sheet consisting of a textured layer having texture on one surface side or the multilayered laminated resin sheet having said textured layer, any method of forming a resin sheet may be used. For example, the respective raw material resins can be melt-extruded using a single uniaxial extruder in the case of a single layer, or in the case of multiple layers, using plural uniaxial extruders, then obtaining resin sheets using a T-die.

In the case of multiple layers, a multi-manifold die may be used. While the layer structures of the respective embodiments of the thermoplastic resin sheet of the present invention are basically as described above, it is also possible to add scrap raw material generated during the production process of the resin sheet or molded container of the present invention to the styrenic resin layer as long as no degradation in physical properties or the like is observed, or to laminate the material as further layers.

Next, a texture is formed on the single layer or laminated multilayered resin sheet, but this method is also not particularly restricted, and any method known to those skilled in the art may be used. Examples include methods of production using an extrusion molding system, methods of production using a photolithography system, methods of production using a hot press system, and methods of production using patterned rollers and UV-cured resins.

Next, in order to preserve the texture of the textured layer even after thermoforming so as to maintain the desired water repellence, at least a surface portion of the textured layer is crosslinked. In this case, "at least a surface portion of the textured layer" refers to a surface portion of the textured layer to form the sheet surface, including almost the entire textured portion. This crosslinking treatment can be performed by irradiating the sheet surface on which the textured layer of the resin sheet lies with electron beams. In other words, as mentioned above, the textured layer is formed using a composition comprising a polyethylene resin. Polyethylenes, like polypropylenes, polyvinylidene fluorides, polymethyl acrylates, polyvinyl chlorides, polybutadienes, vinyl alcohols and polyamides, are crosslinking polymers in which molecular crosslinking occurs preferentially as a result of electron beam irradiation, among which linear low-density polyethylenes and linear medium-density polyethylenes easily crosslink, and linear low-density polyethylenes in particular tend to crosslink most easily. Therefore, when the sheet surface on which the textured layer lies is irradiated with electron beams, at least the surface portion of the textured layer can be crosslinked.

The conditions for electron beam irradiation of the polyethylene resin are an acceleration voltage of 110 to 210 kV and a radiation dose of 120 to 400 kGy. By irradiating the surface of the textured sheet with electron beams in this range of conditions, at least the surface portion can be converted to a crosslinked material that maintains the texture even after thermoforming. Additionally, even if the entire textured sheet is irradiated in the case of a single layer, only a small dose of the electron beam radiation reaches the opposite face from that on which the texture is formed, so there is no risk of the physical properties being affected, and even if the radiation penetrates past the textured layer in the case of multiple layers, only a small dose of the electron beam radiation reaches the sealant resin layer, so there is no risk of the interlayer adhesion being affected. On the other hand, if the radiation conditions are weaker than these conditions, then the textured portion of the textured layer cannot be crosslinked to a degree enabling its shape to be roughly maintained even after heated drawing, and if the radiation conditions are stronger than these conditions, there is a risk of sealing defects occurring with the lid member used for packaging (insufficient peel strength being obtained). While the degree of crosslinking of the crosslinked material formed on the textured layer is not particularly limited, the crosslinking should be such that, when the thermoplastic multilayered resin sheet is subjected to heated drawing at a draw ratio of 0.05 to 2.5 times, the height of the bumps is adequately maintained before and after drawing, preferably such that the rate of decrease in height is 30% or less, more preferably 25% or less, and even more preferably 20% or less. While the above-described drawing ratios are examples of drawing ratios for the edge portions of a container when molding containers for use with food products, even in molded containers for other applications, the degree of crosslinking can be set as an indicator of the rate of decrease in height of bumps when performing heated drawing under the same conditions, and containers molded by means of sheets satisfying these conditions can achieve the desired water repellence when used in conjunction with the above-described water repellent layer.

Finally, a water repellent layer is formed on the surface of the textured layer. The method for forming a water repellent layer is not particularly restricted, and for example, publicly known coating methods such as roll coating, gravure coating, bar coating, doctor blade coating, brush coating and electrostatic powder coating can be used. Additionally, the solvent used when preparing the coating solution is not particularly restricted, and aside from water, organic solvents such as alcohol (ethanol), cyclohexane, toluene, acetone IPA, propylene glycol, hexylene glycol, butyl diglycol, pentamethylene glycol, normal pentane, normal hexane and hexyl alcohol may be appropriately selected. In this case, small amounts of dispersant, colorants, anti-settling agents and viscosity adjusting agents may also be used.

While the above describes an example wherein the textured layer is crosslinked by electron beam irradiation before forming the water repellent layer on the textured layer, the crosslinking may be performed after laminating the water repellent layer onto the textured layer. However, in that case, the substrate resin to be used in the water repellent layer must be chosen so as not to be affected by the electron beam irradiation, or must be of crosslinked type such as a polyethylene.

<Thermoplastic Resin Sheet>

The thickness of the thermoplastic resin sheet of the present invention is preferably 500 to 1200 μm, more preferably 700 to 1000 μm. At less than 500 μm, the thickness distribution of the container obtained by thermoforming can be poor, and at more than 1200 μm, the production cost of the container can become too high.

The thermoplastic resin sheet according to the present invention has a water repellent layer on top of the textured layer, providing a texture that retains a microscopic texture even after heated drawing, so the water repellence due to the microscopic texture and the water repellent layer together result in exceptional water repellence. In other words, with the thermoplastic resin sheet of the present invention, as mentioned above, the angle of contact of liquids is at least 100°, so that it has sufficient water repellence and liquids slide across the sheet. If the angle of contact is less than 100°, then liquids may not slide across the sheet, in which case it cannot be considered to have water repellence.

Additionally, in the thermoplastic resin sheet according to the present invention, the sliding angle of liquids is preferably 70° or less. If the sliding angle exceeds 70°, then slidability of liquids may not be obtained at the edge portions of the container, or slidability may not be obtained even after thermoforming into a container. Furthermore, the sliding speed of the liquid, measured as the sliding speed at a tilt angle of 70°, should preferably be 0.01 m/sec to 0.2 m/sec. In this speed range, slidability of liquids can be obtained even after thermoforming. On the other hand, at less than 0.01 m/sec, slidability of the liquid may not be obtained at the edge portions of the container, and slidability may not be obtained after thermoforming into a container.

<Molded Container>

The molded container of the present invention is formed by thermoforming the thermoplastic resin sheet of the present invention. While thermoforming methods include general vacuum forming and pressure forming, and as applications thereof, plug-assist methods wherein a plug is brought into contact with one face of the sheet, and methods referred to as so-called match molding wherein molding is performed while contacting male and female molds forming a pair with both surfaces of the sheet, the methods are not restricted thereto. Additionally, as methods of heat-softening sheets before molding, publicly known sheet heating methods such as radiation heating by means of an infrared heater or the like, which is a non-contact heating method, may be used.

The molded container of the present invention has water repellence. That is, as mentioned above, at an upper edge portion of the molded container, the angle of contact of liquids is at least 100°, so that liquids will roll across the sheet. If the angle of contact is less than 100°, slidability of liquids may not be obtained at the upper edge portion of the molded container, in which case the water repellence cannot be considered to be sufficient. Additionally, the water repellence of the molded container can also be evaluated by slidability of liquids. In other words, since the tilt angle of the upper edge portion of a container is 70°, the sliding angle of the molded container should preferably be 70° or less. If the sliding angle exceeds 70°, there may be cases in which slidability of the liquid is not obtained at the upper edge portions of the container.

EXAMPLES

While the present invention will be explained in detail below by giving examples and comparative examples, the present invention is not to be construed as being limited in any way by the content of the examples etc.

The raw materials used in the examples etc. are as follows.

(1) Textured Layer
(A-1) Linear medium-density polyethylene resin (C4) "NEO-ZEX 45200" (Prime Polymer)
(A-2) Linear low-density polyethylene resin (C6) "ULTZEX 20200J" (Prime Polymer)
(B) Styrene-conjugated diene block copolymer resin "730L" (Denka) (Diene content 25 mass %)
(C) GPPS resin "G100C" (Toyo Styrene)
(2) Water Repellent Layer
(D) Hydrophobic oxide microparticles: hydrophobic silica "Aerosil R812S" (Evonik Degussa) Primary particle size: 7 nm
(E) Olefinic copolymer resin: "Chemipearl S 100" (Mitsui Chemicals) Emulsion particle size: 100 nm or less
(3) Sealant Resin Layer and Modified Olefinic Polymer Resin Layer
(F) HIPS resin "Toyostyrol H850N" (Toyo Styrene, butadiene content 9.0 mass %)
(G) Hydrogenated styrenic thermoplastic elastomer "Tuftec P2000" (Asahi Kasei)
(B) Styrene-conjugated diene block copolymer resin "730L" (Denka) (Diene content 25 mass %)
(H) Modified olefinic polymer resin "Modic F502" (Mitsubishi Chemical)
(I) Hydrogenated styrenic thermoplastic elastomer "Tuftec H1041" (Asahi Kasei)
(4) Substrate Layer: Styrenic Resin Layer
(F) HIPS resin "Toyostyrol H850N" (Toyo Styrene, butadiene content 9.0 mass %)

(J) GPPS resin "HRM 23" (Toyo Styrene)
(5) Oxygen Barrier Resin Layer
(K) Ethylene-vinyl alcohol copolymer "Eval J-102B" (Kuraray, ethylene content 32 mol %, saponification 99% or more)

The methods for evaluation of various properties of the thermoplastic resin sheets produced in the examples and containers molded using said thermoplastic resin sheets are as follows.

(1) Moldability

The moldability of yogurt containers was evaluated under the following criteria:
Good: good moldability
Poor: holes form during heating and molding, molding defects occur (2) Texture Observation The texture on the sheets and the texture at the upper edge portions of the molded yogurt containers (see FIG. 6) were observed using a laser microscope VK-X100 (Keyence), the sheets were measured for bump height, bump diameter and bump pitch, and for the yogurt containers, only the bump heights were recorded. Additionally, samples for observation of the texture cross section were produced using microtomes.

(3) Sliding Speed

The sliding speeds were measured using an automatic contact angle meter DM-501 (Kyowa Interface Science). With the sheet tilted 70°, the speed by which liquids slid across the surface of the textured layer forming the water repellent layer was measured. Additionally, as the test liquid, yogurt (Morinaga Milk Industry "Bifidus Plain") was used, the amount dropped being 20 µL.

(4) Sealability Evaluation

The flange portion of a molded yogurt container (see FIG. 6) was cut away and heat sealed using a heat seal tester (Sagawa Manufacturing). A sealing iron of width 1.0 mm was used for the heat seal tester, and as the sealing member, a lid member with water repellence used in Morinaga Milk Industry "Bifidus Plain" was used. The sealing temperature was 225° C. and the sealing pressure was 0.36 Mpa. Additionally, the peel strength was measured using a strograph VE1D (Toyo Seiki), by grasping the lid member with a chuck portion on one side of the strograph and the sheet sample with the other chuck portion. The peeling speed was 200 mm/min. The sealability was judged to be good when the peel strength was at least 2.8 N.

(5) Drawing Ratio

The drawing ratio was calculated for the molded yogurt containers, by measuring the thickness of the upper edge portions (see FIG. 6) of the container, and using the following formula:

Drawing ratio: sheet thickness/molded article edge thickness (6) Decrease in Bump Height The decrease in bump height was calculated for the molded yogurt containers, by measuring the bump height in the upper edge portions of the container (see FIG. 6), and using the following formula:

$$\text{Bump height decrease} = \frac{\text{Bump height on sheet} - \text{Bump height at molded article edge}}{\text{Bump height on sheet}} \times 100 \quad [\text{Formula 1}]$$

If the decrease in bump height is 30% or less, then the microscopic texture can be considered to be maintained before and after molding.

(7) Angle of Contact and Sliding Angle

The angle of contact and sliding angle were measured for the sheet and molded yogurt container using an automatic contact angle meter DM-501 (Kyowa Interface Science). For the yogurt container, an upper edge portion of the container (see FIG. 6) was cut away and measured. Additionally, as the test liquid, yogurt (Morinaga Milk Industry "Bifidus Plain") was used, the amount dropped being 20 µL.

If the angle of contact is at least 100°, the water repellence can be considered to be high, and the adhesion of yogurt can be judged to be prevented. Additionally, if the sliding angle is 70° or less, then the water repellence can be considered to be high, and the adhesion of yogurt can be judged to be prevented.

(8) Punchability

After punching out the molded yogurt container (see FIG. 7), the cut face of the container was observed visually, and evaluated according to the following criteria.
Good: no resin whiskers observed on cut surface
Poor: resin whiskers and burrs observed on cut surface (9) Container Strength The strength of the molded yogurt container was measured using a strograph VE1D (Toyo Seiki) in accordance with the JIS K7181 standard, at a testing speed of 50 mm/min, and those with a compression strength of at least 25 N were judged to be good.

(10) Oxygen Permeability

The oxygen permeability was measured using an OX-TRAN oxygen permeability measuring device (Mocon) in accordance with the JIS K7126-B standard, under measurement conditions of a temperature of 25° C. and a relative humidity of 65%. The oxygen barrier capability can be judged to be good when the oxygen permeability is less than 3.0 ml/m²·day·atm.

Example 1 (Layer Structure of FIG. 1)

A single 40 mm uniaxial extruder was used to extrude a resin sheet by a T-die method. This extruded sheet was cast with a transfer roller provided with a texture on the surface by laser engraving and a touch roller, to obtain a thermoplastic resin sheet having a textured layer with a texture on the surface. The sheet thickness was 0.9 mm, the texture transfer roller and the touch roller were set to a temperature of 85° C., and the touch pressure was set to 9 MPa.

A thermoplastic resin sheet consisting of a textured layer provided with a texture as described above was irradiated with electron beams using an electron beam irradiation device (Eye Electron Beam) under irradiation conditions according to irradiation conditions 1 (acceleration voltage 150 kV, radiation dose 200 kGy), irradiation conditions 2 (acceleration voltage 200 kV, radiation dose 250 kGy) and irradiation conditions 3 (acceleration voltage 200 kV, radiation dose 150 kGy), to perform crosslinking of the textured layer.

Subsequently, in order to form a water repellent layer on the surface of the textured layer, a dispersion solution of hydrophobic silica and olefinic copolymer resin was prepared with 59 mass % of the hydrophobic silica and 41 mass % of the olefinic copolymer resin (the solvent was a mixed solution of purified water/ethanol). This mixed dispersion solution was coated onto the crosslinked textured layer surface using a bar coater, and dried at 100° C. to form a water repellent layer. The compositions of these thermoplastic resin sheets having a water repellent layer formed on the surface of the textured layer are shown in Table 1 (the numbers in the parentheses for the water repellent layer indicate the thickness of the water repellent layer after drying).

The resin sheets prepared as described above were evaluated as to their various properties by the methods described above. Additionally, using the resulting resin sheets, molded yogurt containers were produced in a vacuum/pressure former (Asano Laboratories) using a mold for yogurt containers (see FIG. 6), and the various properties of the containers were also evaluated by the methods described above. The results are shown in Table 2.

TABLE 1

| | | Textured Layer | | | | Water Repellent Layer | | Electron Beam | |
| --- | --- | --- | --- | --- | --- | --- | --- | --- | --- |
| | | (A-1) Polyethylene resin | (A-2) Polyethylene resin | (B) Styrene-Conjugated Diene Block Copolymer Resin | (C) GPPS resin | (D) Hydrophobic silica | (E) Olefinic Copolymer resin | Acceleration Voltage (kV) | Radiation Dose (KGy) |
| Example 1 | Composition (mass %) | 50 | — | 50 | — | 59 | 41 | 200 | 250 |
| | Sheet thickness (μm) | | | 900 | | coat thickness 12 (768 nm) | | | |
| Example 2 | Composition (mass %) | — | 50 | 50 | — | 47 | 53 | 200 | 250 |
| | Sheet thickness (μm) | | | 900 | | coat thickness 12 (744 nm) | | | |
| Example 3 | Composition (mass %) | 50 | — | 50 | — | 63 | 37 | 150 | 200 |
| | Sheet thickness (μm) | | | 900 | | coat thickness 12 (552 nm) | | | |
| Example 4 | Composition (mass %) | — | 65 | 35 | — | 59 | 41 | 150 | 200 |
| | Sheet thickness (μm) | | | 900 | | coat thickness 24 (1536 nm) | | | |
| Example 5 | Composition (mass %) | 65 | — | 35 | — | 47 | 53 | 200 | 250 |
| | Sheet thickness (μm) | | | 900 | | coat thickness 24 (1488 nm) | | | |
| Example 6 | Composition (mass %) | 50 | — | — | 50 | 59 | 41 | 150 | 200 |
| | Sheet thickness (μm) | | | 900 | | coat thickness 12 (768 nm) | | | |
| Example 7 | Composition (mass %) | 75 | — | — | 25 | 59 | 41 | 200 | 250 |
| | Sheet thickness (μm) | | | 900 | | coat thickness 24 (1536 mn) | | | |
| Example 8 | Composition (mass %) | — | 75 | 25 | — | 63 | 37 | 200 | 250 |
| | Sheet thickness (μm) | | | 900 | | coat thickness 24 (1104 nm) | | | |
| Example 9 | Composition (mass %) | — | 50 | — | 50 | 47 | 53 | 200 | 250 |
| | Sheet thickness (μm) | | | 900 | | coat thickness 12 (744 mn) | | | |
| Example 10 | Composition (mass %) | 65 | — | — | 35 | 59 | 41 | 150 | 200 |
| | Sheet thickness (μm) | | | 900 | | coat thickness 12 (768 nm) | | | |
| Example 11 | Composition (mass %) | — | 65 | — | — | 59 | 41 | 200 | 150 |
| | Sheet thickness (μm) | | | 900 | | coat thickness 12 (768 nm) | | | |
| Example 12 | Composition (mass %) | — | 75 | — | 25 | 59 | 41 | 200 | 150 |
| | Sheet thickness (μm) | | | 900 | | coat thickness 12 (768 nm) | | | |
| Comparative Example 1 | Composition (mass %) | 50 | — | 50 | — | — | — | — | — |
| | Layer thickness (μm) | | | 900 | | — | | | |
| Comparative Example 2 | Composition (mass %) | — | 50 | 50 | — | 59 | 41 | 150 | 200 |
| | Layer thickness (μm) | | | 900 | | coat thickness 12 (768 nm) | | | |
| Comparative Example 3 | Composition (mass %) | 50 | — | 50 | — | 59 | 41 | — | — |
| | Layer thickness (μm) | | | 900 | | coat thickness 12 (768 nm) | | | |
| Comparative Example 4 | Composition (mass %) | 50 | — | 50 | — | 59 | 41 | — | — |
| | Layer thickness (μm) | | | 900 | | coat thickness 12 (768 nm) | | | |
| Comparative Example 5 | Composition (mass %) | 50 | — | — | 50 | 100 | — | 200 | 250 |
| | Layer thickness (μm) | | | 900 | | coat thickness 24 (960 nm) | | | |
| Comparative Example 6 | Composition (mass %) | 75 | — | 25 | — | 59 (surface untreated) | 41 | 200 | 250 |
| | Layer thickness (μm) | | | 900 | | coat thickness 12 (768 nm) | | | |
| Comparative Example 7 | Composition (mass %) | 100 | — | — | — | 59 | 41 | 200 | 250 |
| | Layer thickness (μm) | | | 900 | | coat thickness 12 (768 nm) | | | |

TABLE 2

| | Thermoplastic Resin Sheet Evaluation (before heated drawing) | | | | | | | | | |
| --- | --- | --- | --- | --- | --- | --- | --- | --- | --- | --- |
| | Bump Height (μm) | Bump Bottom Diam. (μm) | Bump Vertex Pitch (μm) | Aspect Ratio (Bump Height/ Bump Bottom Diam.) | Bump Vertex Diam. (μm) | (Bump Vertex Diam./ Bump Bottom Diam.) | Bump Arrangement | Contact Angle (°) yogurt | Sliding Angle (°) yogurt | Sliding Speed (m/s) yogurt |
| Example 1 | 55 | 72 | 75 | 0.76 | 11 | 0.15 | staggered | 144 | 37 | 0.05 |
| Example 2 | 66 | 120 | 122 | 0.55 | 25 | 0.21 | staggered | 141 | 39 | 0.08 |
| Example 3 | 55 | 72 | 75 | 0.76 | 11 | 0.15 | staggered | 148 | 34 | 0.04 |
| Example 4 | 55 | 72 | 75 | 0.76 | 11 | 0.15 | staggered | 152 | 30 | 0.05 |
| Example 5 | 55 | 72 | 75 | 0.76 | 11 | 0.15 | staggered | 151 | 30 | 0.07 |
| Example 6 | 66 | 120 | 122 | 0.55 | 25 | 0.21 | staggered | 144 | 35 | 0.06 |

TABLE 2-continued

| | | | | | | | | | | |
|---|---|---|---|---|---|---|---|---|---|---|
| Example 7 | 55 | 72 | 75 | 0.76 | 11 | 0.15 | staggered | 155 | 27 | 0.06 |
| Example 8 | 66 | 120 | 122 | 0.55 | 25 | 0.21 | staggered | 156 | 25 | 0.06 |
| Example 9 | 66 | 120 | 122 | 0.55 | 25 | 0.21 | staggered | 135 | 40 | 0.09 |
| Example 10 | 66 | 120 | 122 | 0.55 | 25 | 0.21 | staggered | 144 | 36 | 0.08 |
| Example 11 | 66 | 82 | 122 | 0.80 | 30 | 0.37 | staggered | 141 | 37 | 0.05 |
| Example 12 | 66 | 82 | 122 | 0.80 | 30 | 0.37 | staggered | 140 | 38 | 0.05 |
| Comparative Example 1 | 55 | 72 | 75 | 0.76 | 11 | 0.15 | staggered | 121 | >70 | did not slide |
| Comparative Example 2 | | | | untextured | | | | 135 | 48 | 0.11 |
| Comparative Example 3 | 55 | 72 | 75 | 0.76 | 11 | 0.15 | staggered | 143 | 38 | 0.05 |
| Comparative Example 4 | 20 | 40 | 200 | 0.50 | 7 | 0.18 | staggered | 139 | 41 | 0.09 |
| Comparative Example 5 | 55 | 72 | 75 | 0.76 | 11 | 0.15 | staggered | 158 | 29 | 0.03 |
| Comparative Example 6 | 66 | 120 | 122 | 0.55 | 25 | 0.21 | staggered | 90 | >70 | did not slide |
| Comparative Example 7 | 66 | 120 | 122 | 0.55 | 25 | 0.21 | staggered | 144 | 38 | 0.08 |

Molded Article Evaluation (after heated drawing)

| | Drawing Ratio (%) | Bump Height (μm) | Decrease (%) | Contact Angle yogurt | Sliding Angle yogurt | Sealability (Peel Strength) (N) | Moldability | Punchability |
|---|---|---|---|---|---|---|---|---|
| Example 1 | 1.8 | 50 | 9 | 135 | 41 | 3.4 | good | good |
| Example 2 | 1.9 | 59 | 11 | 124 | 48 | 3.6 | good | good |
| Example 3 | 2.1 | 44 | 20 | 138 | 52 | 3.3 | good | good |
| Example 4 | 2.3 | 43 | 22 | 135 | 43 | 3.6 | good | good |
| Example 5 | 1.7 | 51 | 7 | 136 | 50 | 3.2 | good | good |
| Example 6 | 2.0 | 55 | 17 | 125 | 48 | 3.2 | good | good |
| Example 7 | 1.7 | 50 | 9 | 133 | 42 | 3.1 | good | good |
| Example 8 | 1.7 | 58 | 12 | 138 | 45 | 3.1 | good | good |
| Example 9 | 1.8 | 57 | 14 | 121 | 51 | 3.1 | good | good |
| Example 10 | 2.5 | 54 | 18 | 123 | 43 | 3.5 | good | good |
| Example 11 | 2.5 | 48 | 27 | 125 | 43 | 3.1 | good | good |
| Example 12 | 2.5 | 48 | 27 | 127 | 43 | 3.1 | good | good |
| Comparative Example 1 | 1.8 | 14 | 75 | 98 | did not slide | 3.3 | good | good |
| Comparative Example 2 | 1.9 | — | — | 97 | did not slide | 3.2 | good | good |
| Comparative Example 3 | 1.8 | 15 | 73 | 98 | did not slide | 3.4 | good | good |
| Comparative Example 4 | 4.0 | 8 | 60 | 95 | did not slide | 3.2 | good | good |
| Comparative Example 5 | 1.7 | 49 | 11 | 102 | did not slide | 3.3 | good | good |
| Comparative Example 6 | 1.8 | 55 | 17 | 103 | did not slide | 3.1 | good | good |
| Comparative Example 7 | 4.1 | 61 | 8 | 134 | 47 | 2.0 | poor | poor |

Examples 2-12, Comparative Examples 1-7

Thermoplastic resin sheets according to Examples 2-12 and Comparative Examples 1-7 were prepared in the same manner as Example 1, apart from the compositions and thicknesses of the textured layer and water repellent layer, and the electron beam irradiation conditions, which were set as shown in Table 1. Yogurt containers molded using these thermoplastic resin sheets were subjected to evaluation tests similar to that of Example 1, and the results are shown in Table 2.

In Comparative Example 1, no water repellent layer was formed, and crosslinking by electron beam irradiation was not performed, while in Comparative Example 2, a texture was not provided. In Comparative Example 3, crosslinking by electron beam irradiation was not performed, in Comparative Example 4, the bump height was made low and crosslinking by electron beam irradiation was not performed, and in Comparative Example 5, an olefinic copolymer resin was not used in the water repellent layer. In Comparative Example 6, a silica that was not surface-treated by hydrophobization was used for the water repellent layer, and in Comparative Example 7, the textured sheet was composed only of a polyethylene resin.

The following is clear from the results shown in Table 2.

In all of Examples 1-12, results satisfying all the evaluation criteria for water repellence (angle of contact, sliding angle) in the case of sheets, and bump height decrease, water repellence (angle of contact, sliding angle), sealability, container moldability and punchability in the case of molded articles were obtained. On the other hand, in Comparative Examples 1-6, yogurt did not slide on either the sheet or the upper edge portion of the container. In Comparative Example 7, the peel strength of the lid member was low, resulting in generation of resin burrs for the punchability of the container.

Example 13 (Layer Structure of FIG. 3)

Three 40 mm uniaxial extruders were used to extrude from a T-die a multilayered resin sheet of thickness 900 μm having a layer structure consisting of a 75 μm textured layer/40 μm sealant resin layer/785 μm styrenic resin layer, by means of a feed block process. As the styrenic resin layer, a mix of a HIPS resin and a GPPS resin at a mass ratio of 80/20 (HIPS/GPPS) was used.

This extruded sheet was cast with a transfer roller provided with a texture on the surface by laser engraving and a touch roller, to obtain a thermoplastic resin sheet having a textured layer with texture on the surface. The sheet thickness was 0.9 mm, the texture transfer roller and the touch roller were set to a temperature of 85° C., and the touch pressure was set to 9 MPa.

A thermoplastic resin sheet provided with a texture as described above was irradiated with electron beams using an electron beam irradiation device (Eye Electron Beam) under irradiation conditions according to irradiation conditions 1 (acceleration voltage 150 kV, radiation dose 200 kGy), irradiation conditions 2 (acceleration voltage 200 kV, radiation dose 250 kGy) and irradiation conditions 3 (acceleration voltage 200 kV, radiation dose 150 kGy), to perform crosslinking of the textured layer.

Subsequently, in order to form a water repellent layer on the surface of the textured layer, a dispersion solution of hydrophobic silica and olefinic copolymer resin was prepared with 59 mass % of the hydrophobic silica and 41 mass % of the olefinic copolymer resin (the solvent was a mixed solution of purified water/ethanol). This mixed dispersion solution was coated onto the crosslinked textured layer surface using a bar coater, and dried at 100° C. to form a water repellent layer. The compositions and layer structures of these thermoplastic resin sheets having a water repellent layer formed on the surface of the textured layer are shown in Table 3 (the numbers in the parentheses for the water repellent layer indicate the thickness of the water repellent layer after drying).

The resin sheets prepared as described above were evaluated as to their various properties by the methods described above. Additionally, using the resulting resin sheets, molded articles of yogurt containers were produced in a vacuum/pressure former (Asano Laboratories) using a mold for yogurt containers, and the various properties of the containers were also evaluated by the methods described above. The results are shown in Table 4.

TABLE 3

| | | Textured Layer | | | | Water Repellent Layer | | Sealant Resin Layer | |
|---|---|---|---|---|---|---|---|---|---|
| | | (A-1) Polyethylene Resin | (A-2) Polyethylene Resin | (B) Styrene-Conjugated Diene Block Copolymer Resin | (C) GPPS Resin | (D) Hydrophobic Silica | (E) Olefinic Copolymer Resin | (F) HIPS Resin | (G) Hydr. Styrenic Thermoplastic Elastomer |
| Example 13 | Composition (mass %) | 50 | — | 50 | — | 59 | 41 | 95 | 5 |
| | Layer thickness (μm) | | | 75 | | coat thickness 12 (768 nm) | | 40 | |
| Example 14 | Composition (mass %) | — | 50 | 50 | — | 47 | 53 | 90 | 10 |
| | Layer thickness (μm) | | | 110 | | coat thickness 12 (744 nm) | | 30 | |
| Example 15 | Composition (mass %) | 50 | — | 50 | — | 63 | 37 | — | — |
| | Layer thickness (μm) | | | 75 | | coat thickness 12 (552 nm) | | 50 | |
| Example 16 | Composition (mass %) | — | 65 | 35 | — | 59 | 41 | — | — |
| | Layer thickness (μm) | | | 75 | | coat thickness 24 (1536 nm) | | 50 | |
| Example 17 | Composition (mass %) | 65 | — | 35 | — | 47 | 53 | 95 | 5 |
| | Layer thickness (μm) | | | 75 | | coat thickness 24 (1488 nm) | | 30 | |
| Example 18 | Composition (mass %) | 50 | — | — | 50 | 59 | 41 | 95 | 5 |
| | Layer thickness (μm) | | | 110 | | coat thickness 12 (768 nm) | | 40 | |
| Example 19 | Composition (mass %) | 75 | — | — | 25 | 59 | 41 | — | — |
| | Layer thickness (μm) | | | 75 | | coat thickness 24 (1536 nm) | | 40 | |
| Example 20 | Composition (mass %) | — | 75 | 25 | — | 63 | 37 | 93 | 7 |
| | Layer thickness (μm) | | | 110 | | coat thickness 24 (1104 nm) | | 60 | |
| Example 21 | Composition (mass %) | — | 50 | — | 50 | 47 | 53 | — | — |
| | Layer thickness (μm) | | | 110 | | coat thickness 12 (744 nm) | | 70 | |
| Example 22 | Composition (mass %) | 65 | — | — | 35 | 59 | 41 | 95 | 5 |
| | Layer thickness (μm) | | | 75 | | coat thickness 12 (768 nm) | | 50 | |
| Example 23 | Composition (mass %) | — | 65 | — | 35 | 59 | 41 | 95 | 5 |
| | Layer thickness (μm) | | | 85 | | coat thickness 12 (768 nm) | | 40 | |
| Example 24 | Composition (mass %) | — | 75 | — | 25 | 59 | 41 | — | — |
| | Layer thickness (μm) | | | 85 | | coat thickness 12 (768 nm) | | 25 | |
| Example 25 | Composition (mass %) | 50 | — | 50 | — | 59 | 41 | — | — |
| | Layer thickness (μm) | | | 75 | | coat thickness 12 (768 nm) | | — | |
| Example 26 | Composition (mass %) | 50 | — | — | 50 | 59 | 41 | — | — |
| | Layer thickness (μm) | | | 75 | | coat thickness 12 (768 nm) | | — | |
| Comparative Example 8 | Composition (mass %) | 50 | — | 50 | — | — | — | 95 | 5 |
| | Layer thickness (μm) | | | 75 | | — | | 40 | |
| Comparative Example 9 | Composition (mass %) | — | 50 | 50 | — | 59 | 41 | — | — |
| | Layer thickness (μm) | | | 110 | | coat thickness 12 (768 nm) | | 25 | |
| Comparative Example 10 | Composition (mass %) | 50 | — | — | 50 | 59 | 41 | 95 | 5 |
| | Layer thickness (μm) | | | 75 | | coat thickness 12 (768 nm) | | 50 | |
| Comparative Example 11 | Composition (mass %) | 50 | — | 50 | — | 59 | 41 | — | — |
| | Layer thickness (μm) | | | 35 | | coat thickness 12 (768 nm) | | 60 | |
| Comparative Example 12 | Composition (mass %) | 50 | — | — | 50 | 100 | — | — | — |
| | Layer thickness (μm) | | | 75 | | coat thickness 24 (960 nm) | | 70 | |

TABLE 3-continued

| | | | | | | | | |
|---|---|---|---|---|---|---|---|---|
| Comparative Example 13 | Composition (mass %) Layer thickness (μm) | 65 | 110 | 35 | — | 59 coat thickness 12 (768 nm) | 41 | — | — |
| Comparative Example 14 | Composition (mass %) Layer thickness (μm) | 75 | 110 | 25 | — | 59 (surface untreated) coat thickness 12 (768 nm) | 41 | 95 35 | 5 |
| Comparative Example 15 | Composition (mass %) Layer thickness (μm) | 100 | 600 | — | — | 59 coat thickness 12 (768 nm) | 41 | — 50 | — |
| Comparative Example 16 | Composition (mass %) Layer thickness (μm) | 50 | 75 | — | −50 | 59 coat thickness 12 (768 nm) | 41 | 98 50 | 2 |
| Comparative Example 17 | Composition (mass %) Layer thickness (μm) | — | 75 | 50 | 50 | 59 coat thickness 12 (768 nm) | 41 | 95 50 | 5 |
| Comparative Example 18 | Composition (mass %) Layer thickness (μm) | 50 | 75 | 50 | — | 59 coat thickness 12 (768 nm) | 41 | — | — |

| | | Sealant Resin Layer | | | Styrenic Resin Layer | | | Electron Beam | |
|---|---|---|---|---|---|---|---|---|---|
| | | (B) Styrene-Conjugated Diene Block Copolymer Resin | (H) Modified Olefinic Polymer Resin Layer | (I) Hydr. Styrenic Thermoplastic Elastomer | (F) HIPS Resin | (J) GPPS Resin | (G) Hydr. Styrenic Thermoplastic Elastomer | Acceleration Voltage (KV) | Radiation Dose (KGy) |
| Example 13 | Composition (mass %) Layer thickness (μm) | — | — 40 | — | 80 | 20 785 | — | 200 | 250 |
| Example 14 | Composition (mass %) Layer thickness (μm) | — | — 30 | — | 70 | 30 760 | — | 200 | 250 |
| Example 15 | Composition (mass %) Layer thickness (μm) | 100 50 | — | — | 80 | 20 775 | — | 150 | 200 |
| Example 16 | Composition (mass %) Layer thickness (μm) | — | 100 50 | — | 65 | 35 775 | — | 150 | 200 |
| Example 17 | Composition (mass %) Layer thickness (μm) | — | — 30 | — | 70 | 30 795 | — | 200 | 250 |
| Example 18 | Composition (mass %) Layer thickness (μm) | — | — 40 | — | 80 | 20 750 | — | 150 | 200 |
| Example 19 | Composition (mass %) Layer thickness (μm) | — | 100 40 | — | 65 | 35 785 | — | 200 | 250 |
| Example 20 | Composition (mass %) Layer thickness (μm) | — | — 60 | — | 80 | 20 730 | — | 200 | 250 |
| Example 21 | Composition (mass %) Layer thickness (μm) | 100 70 | — | — | 70 | 30 720 | — | 200 | 250 |
| Example 22 | Composition (mass %) Layer thickness (μm) | — | — 50 | — | 80 | 20 775 | — | 150 | 200 |
| Example 23 | Composition (mass %) Layer thickness (μm) | — | — 40 | — | 80 | 20 775 | — | 200 | 150 |
| Example 24 | Composition (mass %) Layer thickness (μm) | — | — 25 | 100 | 80 | 20 790 | — | 200 | 150 |
| Example 25 | Composition (mass %) Layer thickness (μm) | — | — | — | 80 | 20 825 | 5 | 200 | 250 |
| Example 26 | Composition (mass %) Layer thickness (μm) | — | — | — | 70 | 30 825 | 9 | 200 | 250 |
| Comparative Example 8 | Composition (mass %) Layer thickness (μm) | — | — 40 | — | 80 | 20 785 | — | — | — |
| Comparative Example 9 | Composition (mass %) Layer thickness (μm) | — | — 25 | 100 | 70 | 30 765 | — | 150 | 200 |
| Comparative Example 10 | Composition (mass %) Layer thickness (μm) | — | — 50 | — | 80 | 20 775 | — | — | — |
| Comparative Example 11 | Composition (mass %) Layer thickness (μm) | — | 100 60 | — | 65 | 35 805 | — | — | — |
| Comparative Example 12 | Composition (mass %) Layer thickness (μm) | 100 70 | — | — | 80 | 20 755 | — | 200 | 250 |
| Comparative Example 13 | Composition (mass %) Layer thickness (μm) | — | — | — | 30 | 70 790 | — | 150 | 200 |
| Comparative Example 14 | Composition (mass %) Layer thickness (μm) | — | 35 | — | 40 | 60 755 | — | 200 | 250 |
| Comparative Example 15 | Composition (mass %) Layer thickness (μm) | — | 100 50 | — | 80 | 20 250 | — | 200 | 250 |
| Comparative Example 16 | Composition (mass %) Layer thickness (μm) | — | 50 | — | 80 | 20 775 | — | 200 | 250 |
| Comparative Example 17 | Composition (mass %) Layer thickness (μm) | — | 50 | — | 20 | 80 775 | — | 200 | 250 |
| Comparative Example 18 | Composition (mass %) Layer thickness (μm) | — | — | — | 80 | 20 825 | 30 | 200 | 250 |

TABLE 4

Thermoplastic Resin Sheet Evaluation (before heated drawing)

|  | Bump Height (μm) | Bump Bottom Diam. (μm) | Bump Vertex Pitch (μm) | Aspect Ratio (Bump Height/ Bump Bottom Diam.) | Bump Vertex Diam. (μm) | (Bump Vertex Diam./ Bump Bottom Diam.) | Bump Arrangement | Contact Angle (°) yogurt | Sliding Angle (°) yogurt | Sliding Speed (m/s) yogurt |
|---|---|---|---|---|---|---|---|---|---|---|
| Example 13 | 55 | 72 | 75 | 0.76 | 11 | 0.15 | staggered | 145 | 37 | 0.05 |
| Example 14 | 66 | 120 | 122 | 0.55 | 25 | 0.21 | staggered | 140 | 39 | 0.08 |
| Example 15 | 55 | 72 | 75 | 0.76 | 11 | 0.15 | staggered | 148 | 33 | 0.04 |
| Example 16 | 55 | 72 | 75 | 0.76 | 11 | 0.15 | staggered | 151 | 31 | 0.05 |
| Example 17 | 55 | 72 | 75 | 0.76 | 11 | 0.15 | staggered | 149 | 36 | 0.07 |
| Example 18 | 66 | 120 | 122 | 0.55 | 25 | 0.21 | staggered | 142 | 38 | 0.06 |
| example 19 | 55 | 72 | 75 | 0.76 | 11 | 0.15 | staggered | 153 | 30 | 0.06 |
| Example 20 | 66 | 120 | 122 | 0.55 | 25 | 0.21 | staggered | 155 | 30 | 0.06 |
| Example 21 | 66 | 120 | 122 | 0.55 | 25 | 0.21 | staggered | 135 | 40 | 0.09 |
| Example 22 | 66 | 120 | 122 | 0.55 | 25 | 0.21 | staggered | 143 | 38 | 0.08 |
| Example 23 | 66 | 82 | 122 | 0.80 | 30 | 0.37 | staggered | 144 | 38 | 0.05 |
| Example 24 | 66 | 82 | 122 | 0.80 | 30 | 0.37 | staggered | 144 | 38 | 0.05 |
| Example 25 | 55 | 72 | 122 | 0.76 | 11 | 0.15 | staggered | 145 | 38 | 0.06 |
| Example 26 | 55 | 72 | 122 | 0.76 | 11 | 0.15 | staggered | 142 | 38 | 0.05 |
| Comparative Example 8 | 55 | 72 | 75 | 0.76 | 11 | 0.15 | staggered | 120 | >70 | did not slide |
| Comparative Example 9 | | | untextured | | | | | 130 | 50 | 0.11 |
| Comparative Example 10 | 55 | 72 | 75 | 0.76 | 11 | 0.15 | staggered | 142 | 38 | 0.05 |
| Comparative Example 11 | 20 | 40 | 200 | 0.50 | 7 | 0.18 | staggered | 129 | 45 | 0.09 |
| Comparative Example 12 | 55 | 72 | 75 | 0.76 | 11 | 0.15 | staggered | 147 | 25 | 0.03 |
| Comparative Example 13 | 66 | 120 | 122 | 0.55 | 25 | 0.21 | staggered | 144 | 38 | 0.08 |
| Comparative Example 14 | 66 | 120 | 122 | 0.55 | 25 | 0.21 | staggered | 88 | >70 | did not slide |
| Comparative Example 15 | 66 | 120 | 122 | 0.55 | 25 | 0.21 | staggered | 142 | 39 | 0.08 |
| Comparative Example 16 | 55 | 72 | 122 | 0.76 | 26 | 0.36 | staggered | 141 | 38 | 0.08 |
| Comparative Example 17 | 15 | 84 | 122 | 0.18 | 68 | 0.81 | staggered | 142 | 39 | 0.08 |
| Comparative Example 18 | 55 | 72 | 122 | 0.76 | 11 | 0.15 | staggered | 142 | 37 | 0.08 |

Molded Article Evaluation (after heated drawing)

|  | Drawing Ratio (%) | Bump Height (μm) | Decrease (%) | Contact Angle yogurt | Sliding Angle yogurt | Sealability (Peel Strength) (N) | Punchability | Container Strength |
|---|---|---|---|---|---|---|---|---|
| Example 13 | 1.8 | 50 | 9 | 135 | 41 | 3.4 | good | good |
| Example 14 | 1.9 | 59 | 11 | 124 | 48 | 3.6 | good | good |
| Example 15 | 2.1 | 44 | 20 | 138 | 52 | 3.3 | good | good |
| Example 16 | 2.3 | 43 | 22 | 135 | 43 | 3.6 | good | good |
| Example 17 | 1.7 | 51 | 7 | 136 | 50 | 3.2 | good | good |
| Example 18 | 2.0 | 55 | 17 | 125 | 48 | 3.2 | good | good |
| example 19 | 1.7 | 50 | 9 | 133 | 42 | 3.1 | good | good |
| Example 20 | 1.7 | 58 | 12 | 138 | 45 | 3.1 | good | good |
| Example 21 | 1.8 | 57 | 14 | 121 | 51 | 3.1 | good | good |
| Example 22 | 2.5 | 54 | 18 | 123 | 43 | 3.5 | good | good |
| Example 23 | 2.5 | 48 | 27 | 125 | 43 | 3.1 | good | good |
| Example 24 | 2.5 | 48 | 27 | 127 | 43 | 3.1 | good | good |
| Example 25 | 1.9 | 48 | 13 | 127 | 44 | 3.2 | good | good |
| Example 26 | 2.0 | 46 | 16 | 126 | 42 | 3.1 | good | good |
| Comparative Example 8 | 1.8 | 14 | 75 | 98 | did not slide | 3.3 | good | good |
| Comparative Example 9 | 1.9 | — | — | 97 | did not slide | 3.2 | good | good |
| Comparative Example 10 | 1.8 | 15 | 73 | 98 | did not slide | 3.4 | good | good |
| Comparative Example 11 | 4.0 | 8 | 60 | 95 | did not slide | 3.2 | good | good |
| Comparative Example 12 | 1.7 | 49 | 11 | 102 | did not slide | 3.3 | good | good |
| Comparative Example 13 | | | | interlayer separation | | | | |

TABLE 4-continued

| | | | | | | | | |
|---|---|---|---|---|---|---|---|---|
| Comparative Example 14 | 1.8 | 55 | 17 | 103 | did not slide | 3.1 | good | good |
| Comparative Example 15 | 4.1 | 61 | 8 | 134 | 47 | 2.0 | poor | good |
| Comparative Example 16 | | | | interlayer separation | | | | |
| Comparative Example 17 | 2.0 | 5 | 67 | 96 | did not slide | 3.6 | good | poor |
| Comparative Example 18 | 2.0 | 4 | 18 | 123 | 44 | 3.2 | poor | good |

Examples 14-24, Comparative Examples 8-17

Thermoplastic resin sheets according to Examples 14-24 and Comparative Examples 8-17 were prepared in the same manner as Example 13, apart from the compositions and thicknesses of the textured layer, water repellent layer and other layers of the multilayered resin sheet, and the electron beam irradiation conditions, which were set as shown in Table 3. Yogurt containers molded using these thermoplastic resin sheets were subjected to evaluation tests similar to that of Example 13, and the results are shown in Table 4.

In Comparative Example 8, no water repellent layer was formed, and crosslinking by electron beam irradiation was not performed, while in Comparative Example 9, a texture was not provided. In Comparative Example 10, crosslinking by electron beam irradiation was not performed, in Comparative Example 11, the bump height was made low and crosslinking by electron beam irradiation was not performed, and in Comparative Example 12, an olefinic copolymer resin was not used in the water repellent layer. In Comparative Example 13, a sealant resin layer was not included, in Comparative Example 14, a silica that was not subjected to a hydrophobizing surface treatment was used for the water repellent layer, in Comparative Example 15, the textured layer was formed with only a polyethylene resin, in Comparative Example 16, 2 mass % of a hydrogenated styrenic thermoplastic elastomer was added, and in Comparative Example 17, the textured layer consisted of a styrene-conjugated diene block copolymer and a polystyrene resin, and 80 mass % of polystyrene resin was added to the styrenic resin layer.

The following is clear from the results shown in Table 4.

In all of Examples 13-24, results satisfying all the evaluation criteria for water repellence (angle of contact, sliding angle) in the case of sheets, and bump height decrease, water repellence (angle of contact, sliding angle), sealability, punchability and container rigidity in the case of molded articles were obtained. On the other hand, in Comparative Examples 8-12, 14 and 17, yogurt did not slide on either the sheet or the upper edge portion of the container. In Comparative Examples 13 and 16, the adhesion was insufficient, so interlayer separation occurred. In Comparative Example 15, the peel strength of the lid member was low, resulting in generation of resin burrs for the punchability of the container.

Example 25 (Layer Structure of FIG. 4)

Two 40 mm uniaxial extruders were used to extrude from a T-die a multilayered resin sheet of thickness 900 μm having a layer structure consisting of a 75 μm textured layer/825 μm styrenic resin layer, by means of a feed block process. As the styrenic resin layer, a mix of a HIPS resin and a GPPS resin at a mass ratio of 80/20/5 (HIPS/GPPS/hydrogenated styrenic thermoplastic elastomer) was used.

The extruded sheet obtained as described above was subjected to a texture providing process and a water repellent layer forming process in the same manner as Example 13, thereby forming a thermoplastic resin sheet according to Example 25 (see Table 3). The formed thermoplastic resin sheet was subjected to evaluation tests like Example 13, and used to product a molded yogurt container which was evaluated for various properties. The results are shown together in Table 4.

Example 26, Comparative Example 18

Thermoplastic resin sheets according to Example 26 and Comparative Example 18 were prepared in the same manner as Example 25, apart from the compositions and thicknesses of the textured layer, water repellent layer and the styrenic resin layer, and the electron beam irradiation conditions, which were set as shown in Table 3, then their properties were evaluated, and yogurt containers molded using these thermoplastic resin sheets were subjected to evaluation tests, and the results are shown in Table 4. Comparative Example 18 is a composition in which 30 mass % of a hydrogenated styrenic thermoplastic elastomer has been added.

The following is clear from the results shown in Table 4.

In Examples 25 and 26, results satisfying all the evaluation criteria for water repellence (angle of contact, sliding angle) in the case of sheets, and bump height decrease, water repellence (angle of contact, sliding angle), sealability, punchability and container rigidity in the case of molded articles were obtained. On the other hand, Comparative Example 18 resulted in generation of resin burrs for the punchability of the container.

Example 27

Five 40 mm uniaxial extruders were used to extrude from a T-die a multilayered resin sheet of thickness 900 μm having a layer structure consisting of a 75 μm textured layer/20 μm modified olefinic polymer resin layer/30 μm oxygen barrier resin layer/20 μm modified olefinic polymer resin layer/755 μm styrenic resin layer, by means of a feed block process. As the styrenic resin layer, a mix of a HIPS resin and a GPPS resin at a mass ratio of 80/20 (HIPS/GPPS) was used.

This extruded sheet was cast with a transfer roller provided with a texture on the surface by laser engraving and a touch roller, to obtain a thermoplastic resin sheet having a textured layer with texture on the surface. The sheet thickness was 0.9 mm, the texture transfer roller and the touch roller were set to a temperature of 85° C., and the touch pressure was set to 9 MPa.

A thermoplastic resin sheet provided with a texture as described above was irradiated with electron beams using an electron beam irradiation device (Eye Electron Beam) under irradiation conditions according to irradiation conditions 1 (acceleration voltage 150 kV, radiation dose 200 kGy) and irradiation conditions 2 (acceleration voltage 200 kV, radiation dose 250 kGy), to perform crosslinking of the textured layer.

Subsequently, in order to form a water repellent layer on the surface of the textured layer, a dispersion solution of hydrophobic silica and olefinic copolymer resin was prepared with 59 mass % of the hydrophobic silica and 41 mass % of the olefinic copolymer resin (the solvent was a mixed solution of purified water/ethanol). This mixed dispersion solution was coated onto the crosslinked textured layer surface using a bar coater, and dried at 100° C. to form a water repellent layer. The compositions and layer structures of these thermoplastic resin sheets having a water repellent layer formed on the surface of the textured layer are shown in Table 5 (the numbers in the parentheses for the water repellent layer indicate the thickness of the water repellent layer after drying).

The resin sheets prepared as described above were evaluated as to their various properties by the methods described above. Additionally, using the resulting resin sheets, molded yogurt containers were produced in a vacuum/pressure former (Asano Laboratories) using a mold for yogurt containers, and the various properties of the containers were also evaluated by the methods described above. The results are shown in Table 6.

TABLE 5

| | | Textured Layer | | | | Water Repellent Layer | | (H) Modified Olefinic Polymer Resin Layer |
|---|---|---|---|---|---|---|---|---|
| | | (A-1) Polyethylene Resin | (A-2) Polyethylene Resin | (B) Styrene-Conjugated Diene Block Copolymer Resin | (C) GPPS Resin | (D) Hydrophobic Silica | (E) Olefinic Copolymer Resin | |
| Example 27 | Composition (mass %) | 50 | — | 50 | — | 59 | 41 | 100 |
| | Layer thickness (μm) | | | 75 | | coat thickness 12 (768 nm) | | 20 |
| Example 28 | Composition (mass %) | — | 50 | — | 50 | 47 | 53 | 100 |
| | Layer thickness (μm) | | | 110 | | coat thickness 12 (744 nm) | | 30 |
| Example 29 | Composition (mass %) | 50 | — | — | 50 | 63 | 37 | 100 |
| | Layer thickness (μm) | | | 75 | | coat thickness 12 (552 nm) | | 35 |
| Example 30 | Composition (mass %) | — | 65 | 35 | — | 59 | 41 | 100 |
| | Layer thickness (μm) | | | 75 | | coat thickness 24 (1536 nm) | | 20 |
| Example 31 | Composition (mass %) | 65 | — | — | 35 | 47 | 53 | 100 |
| | Layer thickness (μm) | | | 75 | | coat thickness 24 (1488 nm) | | 20 |
| Example 32 | Composition (mass %) | 65 | — | — | 35 | 59 | 41 | 100 |
| | Layer thickness (μm) | | | 110 | | coat thickness 12 (768 nm) | | 20 |
| Example 33 | Composition (mass %) | 75 | — | 25 | — | 59 | 41 | 100 |
| | Layer thickness (μm) | | | 75 | | coat thickness 24 (1536 nm) | | 35 |
| Example 34 | Composition (mass %) | 75 | — | — | 25 | 63 | 37 | 100 |
| | Layer thickness (μm) | | | 110 | | coat thickness 24 (1104 nm) | | 20 |
| Example 35 | Composition (mass %) | 75 | — | 25 | — | 47 | 53 | 100 |
| | Layer thickness (μm) | | | 110 | | coat thickness 12 (744 nm) | | 35 |
| Example 36 | Composition (mass %) | — | 75 | — | 25 | 59 | 41 | 100 |
| | Layer thickness (μm) | | | 75 | | coat thickness 12 (768 nm) | | 20 |
| Comparative Example 19 | Composition (mass %) | 50 | — | 50 | — | — | — | 100 |
| | Layer thickness (μm) | | | 75 | | | | 20 |
| Comparative Example 20 | Composition (mass %) | — | 50 | — | 50 | 59 | 41 | 100 |
| | Layer thickness (μm) | | | 110 | | coat thickness 12 (768 nm) | | 30 |
| Comparative Example 21 | Composition (mass %) | 50 | — | — | 50 | 59 | 41 | 100 |
| | Layer thickness (μm) | | | 75 | | coat thickness 12 (768 nm) | | 35 |
| Comparative Example 22 | Composition (mass %) | 50 | — | 50 | — | 59 | 41 | 100 |
| | Layer thickness (μm) | | | 35 | | coat thickness 12 (768 nm) | | 20 |
| Comparative Example 23 | Composition (mass %) | 50 | — | 50 | — | 100 | — | 100 |
| | Layer thickness (μm) | | | 75 | | coat thickness 24 (960 nm) | | 20 |
| Comparative Example 24 | Composition (mass %) | 65 | — | — | 35 | 59 | 41 | 100 |
| | Layer thickness (μm) | | | 110 | | coat thickness 12 (768 nm) | | 20 |
| Comparative Example 25 | Composition (mass %) | 75 | — | — | 25 | 59 (surface untreated) | 41 | 100 |
| | Layer thickness (μm) | | | 110 | | coat thickness 12 (768 nm) | | 35 |
| Comparative Example 26 | Composition (mass %) | 100 | — | — | — | 59 | 41 | 100 |
| | Layer thickness (μm) | | | 600 | | coat thickness 12 (768 nm) | | 20 |

| | | (K) Oxygen Barrier Resin Layer | (H) Modified Olefinic Polymer Resin Layer | Styrenic Resin Layer | | Electron Beam | |
|---|---|---|---|---|---|---|---|
| | | | | (E) HIPS Resin | (J) GPPS Resin | Acceleration Voltage (KV) | Radiation Dose (KGy) |
| Example 27 | Composition (mass %) | 100 | 100 | 80 | 20 | 200 | 250 |
| | Layer thickness (μm) | 30 | 20 | 755 | | | |
| Example 28 | Composition (mass %) | 100 | 100 | 70 | 30 | 200 | 250 |
| | Layer thickness (μm) | 20 | 30 | 710 | | | |

TABLE 5-continued

|  |  |  |  |  |  |  |  |
|---|---|---|---|---|---|---|---|
| Example 29 | Composition (mass %) | 100 | 100 | 80 | 20 | 150 | 200 |
|  | Layer thickness (μm) | 15 | 35 | 740 |  |  |  |
| Example 30 | Composition (mass %) | 100 | 100 | 65 | 35 | 150 | 200 |
|  | Layer thickness (μm) | 30 | 20 | 755 |  |  |  |
| Example 31 | Composition (mass %) | 100 | 100 | 70 | 30 | 200 | 250 |
|  | Layer thickness (μm) | 30 | 20 | 755 |  |  |  |
| Example 32 | Composition (mass %) | 100 | 100 | 80 | 20 | 150 | 200 |
|  | Layer thickness (μm) | 40 | 20 | 710 |  |  |  |
| Example 33 | Composition (mass %) | 100 | 100 | 65 | 35 | 200 | 250 |
|  | Layer thickness (μm) | 15 | 35 | 740 |  |  |  |
| Example 34 | Composition (mass %) | 100 | 100 | 80 | 20 | 200 | 250 |
|  | Layer thickness (μm) | 30 | 20 | 720 |  |  |  |
| Example 35 | Composition (mass %) | 100 | 100 | 70 | 30 | 200 | 250 |
|  | Layer thickness (μm) | 15 | 35 | 705 |  |  |  |
| Example 36 | Composition (mass %) | 100 | 100 | 80 | 20 | 150 | 200 |
|  | Layer thickness (μm) | 30 | 20 | 755 |  |  |  |
| Comparative Example 19 | Composition (mass %) | 100 | 100 | 80 | 20 | — | — |
|  | Layer thickness (μm) | 30 | 20 | 755 |  |  |  |
| Comparative Example 20 | Composition (mass %) | 100 | 100 | 70 | 30 | 150 | 200 |
|  | Layer thickness (μm) | 20 | 30 | 710 |  |  |  |
| Comparative Example 21 | Composition (mass %) | 100 | 100 | 80 | 20 | — | — |
|  | Layer thickness (μm) | 15 | 35 | 740 |  |  |  |
| Comparative Example 22 | Composition (mass %) | 100 | 100 | 65 | 35 | — | — |
|  | Layer thickness (μm) | 30 | 20 | 795 |  |  |  |
| Comparative Example 23 | Composition (mass %) | 100 | 100 | 80 | 20 | 200 | 250 |
|  | Layer thickness (μm) | 5 | 20 | 780 |  |  |  |
| Comparative Example 24 | Composition (mass %) | — | 100 | 30 | 70 | 150 | 200 |
|  | Layer thickness (μm) | — | 20 | 750 |  |  |  |
| Comparative Example 25 | Composition (mass %) | 100 | 100 | 40 | 60 | 200 | 250 |
|  | Layer thickness (μm) | 15 | 35 | 705 |  |  |  |
| Comparative Example 26 | Composition (mass %) | 100 | 100 | 70 | 30 | 200 | 250 |
|  | Layer thickness (μm) | 30 | 20 | 230 |  |  |  |

TABLE 6

| | Thermoplastic Resin Sheet Evaluation (before heated drawing) | | | | | | | | | |
|---|---|---|---|---|---|---|---|---|---|---|
| | Bump Height (μm) | Bump Bottom Diam. (μm) | Bump Vertex Pitch (μm) | Aspect Ratio (Bump Height/Bump Diam.) | Bump Vertex Diam. (μm) | (Bump Vertex Diam./Bump Bottom Diam.) | Bump Arrangement | Contact Angle (°) yogurt | Sliding Angle (°) yogurt | Sliding Speed (m/s) yogurt | Oxygen Permeability (ml/in$^2$ · day · atm) |
| Example 27 | 55 | 72 | 75 | 0.76 | 11 | 0.15 | staggered | 145 | 36 | 0.05 | 0.21 |
| Example 28 | 66 | 120 | 122 | 0.55 | 25 | 0.21 | staggered | 142 | 38 | 0.08 | 0.25 |
| Example 29 | 55 | 72 | 75 | 0.76 | 11 | 0.15 | staggered | 149 | 33 | 0.04 | 0.29 |
| Example 30 | 55 | 72 | 75 | 0.76 | 11 | 0.15 | staggered | 152 | 29 | 0.05 | 0.15 |
| Example 31 | 55 | 72 | 75 | 0.76 | 11 | 0.15 | staggered | 150 | 30 | 0.07 | 0.23 |
| Example 32 | 66 | 120 | 122 | 0.55 | 25 | 0.21 | staggered | 144 | 35 | 0.06 | 0.28 |
| Example 33 | 55 | 72 | 75 | 0.76 | 11 | 0.15 | staggered | 153 | 28 | 0.06 | 0.16 |
| Example 34 | 66 | 120 | 122 | 0.55 | 25 | 0.21 | staggered | 154 | 25 | 0.06 | 0.2 |
| Example 35 | 66 | 120 | 122 | 0.55 | 25 | 0.21 | staggered | 141 | 37 | 0.09 | 0.24 |
| Example 36 | 66 | 120 | 122 | 0.55 | 25 | 0.21 | staggered | 143 | 35 | 0.08 | 0.2 |
| Comparative Example 19 | 55 | 72 | 75 | 0.76 | 11 | 0.15 | staggered | 123 | >70 | did not slide | 0.25 |
| Comparative Example 20 | | | | untextured | | | | 138 | 48 | 0.11 | 0.2 |
| Comparative Example 21 | 55 | 72 | 75 | 0.76 | 11 | 0.15 | staggered | 144 | 38 | 0.05 | 0.11 |
| Comparative Example 22 | 20 | 40 | 200 | 0.50 | 7 | 0.18 | staggered | 140 | 50 | 0.09 | 0.22 |
| Comparative Example 23 | 55 | 72 | 75 | 0.76 | 11 | 0.15 | staggered | 155 | 23 | 0.03 | 0.23 |
| Comparative Example 24 | 66 | 120 | 122 | 0.55 | 25 | 0.21 | staggered | 143 | 36 | 0.08 | 90 |
| Comparative Example 25 | 66 | 120 | 122 | 0.55 | 25 | 0.21 | staggered | 88 | >70 | did not slide | 0.25 |
| Comparative Example 26 | 66 | 120 | 122 | 0.55 | 25 | 0.21 | staggered | 144 | 38 | 0.08 | 0.19 |

TABLE 6-continued

| | | | | Molded Article Evaluation (after heated drawing) | | | | |
|---|---|---|---|---|---|---|---|---|
| | Drawing Ratio (%) | Bump Height (μm) | Decrease (%) | Contact Angle yogurt | Sliding Angle yogurt | Sealability (Peel Strength) (N) | Punchability | Container Strength |
| Example 27 | 1.8 | 50 | 9 | 135 | 41 | 3.4 | good | good |
| Example 28 | 1.9 | 59 | 11 | 124 | 48 | 3.6 | good | good |
| Example 29 | 2.1 | 44 | 20 | 138 | 52 | 3.3 | good | good |
| Example 30 | 2.3 | 43 | 22 | 135 | 43 | 3.6 | good | good |
| Example 31 | 1.7 | 51 | 7 | 136 | 50 | 3.2 | good | good |
| Example 32 | 2.0 | 55 | 17 | 125 | 48 | 3.2 | good | good |
| Example 33 | 1.7 | 50 | 9 | 133 | 42 | 3.1 | good | good |
| Example 34 | 1.7 | 58 | 12 | 138 | 45 | 3.1 | good | good |
| Example 35 | 1.8 | 57 | 14 | 121 | 51 | 3.1 | good | good |
| Example 36 | 2.5 | 54 | 18 | 123 | 43 | 3.5 | good | good |
| Comparative Example 19 | 1.8 | 14 | 75 | 98 | did not slide | 3.3 | good | good |
| Comparative Example 20 | 1.9 | — | — | 97 | did not slide | 3.2 | good | good |
| Comparative Example 21 | 1.8 | 15 | 73 | 98 | did not slide | 3.4 | good | good |
| Comparative Example 22 | 4.0 | 8 | 60 | 95 | did not slide | 3.2 | good | good |
| Comparative Example 23 | 1.7 | 49 | 11 | 102 | did not slide | 3.3 | good | good |
| Comparative Example 24 | 2.0 | 54 | 18 | 125 | 48 | 3.1 | good | poor |
| Comparative Example 25 | 1.8 | 55 | 17 | 103 | did not slide | 3.1 | good | good |
| Comparative Example 26 | 4.1 | 61 | 8 | 134 | 47 | 2.0 | poor | good |

Examples 28-36, Comparative Examples 19-26

Thermoplastic resin sheets according to Examples 28-36 and Comparative Examples 19-26 were prepared in the same manner as Example 1, apart from the compositions and thicknesses of the textured layer, water repellent layer and other layers of the multilayered resin sheet, and the electron beam irradiation conditions, which were set as shown in Table 1.

In Comparative Example 19, no water repellent layer was formed, and crosslinking by electron beam irradiation was not performed, while in Comparative Example 20, a texture was not provided. In Comparative Example 21, crosslinking by electron beam irradiation was not performed, in Comparative Example 22, the bump height was made low and crosslinking by electron beam irradiation was not performed, and in Comparative Example 23, an olefinic copolymer resin was not used in the water repellent layer. In Comparative Example 24, an oxygen barrier resin layer was not included, in Comparative Example 25, a silica that was not subjected to a hydrophobizing surface treatment was used for the water repellent layer, and in Comparative Example 26, only a polyethylene resin was used.

The following is clear from the results shown in Table 6.

In all of Examples 27-36, results satisfying all the evaluation criteria for water repellence (angle of contact, sliding angle) and oxygen barrier capability in the case of sheets, and bump height decrease, water repellence (angle of contact, sliding angle), sealability, punchability and container rigidity in the case of molded articles were obtained. On the other hand, in Comparative Examples 19-23 and 25, yogurt did not slide on either the sheet or the upper edge portion of the container. In Comparative Example 24, the oxygen permeability was very high, and the container strength was insufficient. In Comparative Example 26, the peel strength of the lid member was low, resulting in generation of resin burrs for the punchability of the container.

While the present invention has been described using various embodiments above, the fact that the technical scope of the present invention is not limited to the scope described in the above embodiments need not be mentioned. The fact that various modifications or improvements could be made to the above-described embodiments would be clear to a person skilled in the art. Additionally, the fact that embodiments including such modifications or improvements may also lie within the technical scope of the present invention is clear from the recitations of the claims.

DESCRIPTION OF REFERENCE NUMBERS 1 textured layer
2 water repellent layer
3 sealant resin layer
4, 4a styrenic resin layer
5a, 5b modified olefinic polymer resin layer
6 oxygen barrier resin layer
h bump height
t bump pitch
D bump bottom diameter
d bump vertex diameter

The invention claimed is:

1. A thermoplastic resin sheet having water repellence, comprising a textured layer having a microscopic texture on one surface; and a water repellent layer formed at a roughly constant thickness on the one surface side of the textured layer;
   wherein at least a surface portion on the one surface side of the textured layer is a crosslinked material that maintains a microscopic texture even after heated drawing, and the water repellent layer consists of an olefinic copolymer resin in which hydrophobic oxide microparticles are in a state of being mixed and dispersed, and wherein the microscopic texture of the textured layer has bumps whose heights are 30 to 100 μm.

2. The thermoplastic resin sheet according to claim 1, wherein a styrenic resin layer is laminated on the other surface of the textured layer.

3. The thermoplastic resin sheet according to claim 2, wherein a sealant resin layer is formed between the textured layer and the styrenic resin layer.

4. The thermoplastic resin sheet according to claim 2, wherein an oxygen barrier resin layer is provided between the textured layer and the styrenic resin layer, and a modified olefinic polymer resin layer is formed both between the oxygen barrier resin layer and the textured layer, and between the oxygen barrier resin layer and the styrenic resin layer.

5. The thermoplastic resin sheet according to claim 1, wherein at least a surface portion on the one surface side of the textured layer is an electron-beam-crosslinked material.

6. The thermoplastic resin sheet according to claim 1, wherein the textured layer is formed of a resin composition comprising 20 to 85 mass % of a polyethylene resin and 80 to 15 mass % of a styrene-conjugated diene block copolymer resin, or a resin composition comprising 20 to 85 mass % of a polyethylene resin and 80 to 15 mass % of a polystyrene resin.

7. The thermoplastic resin sheet according to claim 1, wherein the bumps are in the form of truncated hexagonal pyramids, with bump bottom diameters of 30 to 150 μm, and an aspect ratio (bump height/bump bottom diameter) of 0.5 to 1.0.

8. The thermoplastic resin sheet according to claim 1, wherein the bumps in the texture of the textured layer have a ratio of bump bottom diameter to bump vertex diameter (bump vertex diameter/bump bottom diameter) of 0.05 to 0.4.

9. The thermoplastic resin sheet according to claim 1, wherein the hydrophobic oxide microparticles are hydrophobic silica having trimethylsilyl groups on their surface.

10. The thermoplastic resin sheet according to claim 1, wherein the hydrophobic oxide microparticle content in the water repellent layer is 40 to 80 mass %, and the olefinic copolymer resin content is 60 to 20 mass %.

11. The thermoplastic resin sheet according to claim 1, wherein a sliding speed at which liquid slides across the water repellent layer when the sheet is tilted by 70° with the water repellent layer facing upward is 0.01 m/sec to 0.2 m/sec.

12. The thermoplastic resin sheet according to claim 1, wherein a drawing ratio of heated drawing is 0.05 to 2.5 times, and a rate of decrease of bump height of the textured layer due to heated drawing is 30% or less.

13. The thermoplastic resin sheet according to claim 1, wherein after heated drawing, an angle of contact between a liquid and a surface of the textured layer on which the water repellent layer is formed is at least 100% and a sliding angle is at most 70°.

14. The thermoplastic resin sheet according to claim 1, wherein the surface of the textured layer on which the water repellent layer is formed is capable of being heat-sealed with a lid member for packaging.

15. The thermoplastic multilayered resin sheet according to claim 2, wherein the styrenic resin layer is formed of a styrenic resin composition comprising 60 to 15 mass % of polystyrene resin and 40 to 85 mass % of a high-impact polystyrene resin, or an elastomer-containing styrenic resin composition further comprising 5 to 10 parts by mass of a hydrogenated styrenic thermoplastic elastomer with respect to 100 parts by mass of the styrenic resin composition.

16. The thermoplastic multilayered resin sheet according to claim 4, wherein the oxygen barrier resin layer consists of an ethylene-vinyl alcohol copolymer resin.

17. A molded article formed by thermoforming the thermoplastic multilayered resin sheet according to claim 1.

18. The molded article according to claim 17 which is a molded container.

19. The molded article according to claim 18 which is a container for a food product.

20. The molded article according to claim 19 which is a container for yogurt.

* * * * *